US006031409A

United States Patent [19]

Kimura

[11] Patent Number: 6,031,409

[45] Date of Patent: Feb. 29, 2000

[54] THREE-INPUT MULTIPLIER AND MULTIPLIER CORE CIRCUIT USED THEREFOR

[75] Inventor: Katsuji Kimura, Tokyo, Japan

[73] Assignee: NEC Corporation, Tokyo, Japan

[21] Appl. No.: 08/921,042

[22] Filed: Aug. 29, 1997

[30] Foreign Application Priority Data

Sep. 27, 1996 [JP] Japan .................................. 8-276988

[51] Int. Cl.[7] ........................................................ G06F 7/44

[52] U.S. Cl. ............................................ 327/359; 327/119

[58] Field of Search .................................... 327/355–357, 327/359, 119, 120

[56] References Cited

U.S. PATENT DOCUMENTS

| | | | |
|---|---|---|---|
| 5,438,296 | 8/1995 | Kimura | 327/560 |
| 5,444,648 | 8/1995 | Kimura | 364/841 |
| 5,581,210 | 12/1996 | Kimura | 327/359 |
| 5,617,052 | 4/1997 | Kimura | 327/356 |
| 5,640,121 | 6/1997 | Kimura | 327/359 |

OTHER PUBLICATIONS

J. Choma, Jr., "A Three–Level Broad–Banded Monolithic Analog Multiplier," IEEE Journal of Solid–State Circuits, vol. SC–16, No. 4, Aug. 1981, pp. 329–399.

*Primary Examiner*—Kenneth B. Wells

*Attorney, Agent, or Firm*—Sughrue, Mion, Zinn Macpeak & Seas, PLLC

[57] ABSTRACT

A three-input multiplier core circuit for multiplying first, second, and third initial input voltages $V_x$, $V_y$, and $V_z$ is provided, which is operable at a low supply voltage such as approximately 1 V is provided. This circuit includes an octtail cell having first to eighth bipolar transistors whose emitters are coupled together to be connected to a common constant current source/sink. Collectors of the first to fourth transistors are coupled together to form one of a pair of output terminals, and collectors of the fifth to eighth transistors are coupled together to form the other of the pair thereof. An output including the multiplication result is differentially derived from the pair of output terminals. Bases of the first to eighth transistors are respectively applied with voltages $V_1$ to $V_8$, where $V_1=aV_x+bV_y+cV_z$, $V_2=aV_x+(b-1)V_y+(c-1)V_z$, $V_3=(a-1)V_x+bV_y+(c-1)V_z$, $V_4=(a-1)V_x+(b-1)V_y+cV_z$, $V_5=(a-1)V_x+(b-1)V_y+(c-1)V_z$, $V_6=(a-1)V_x+bV_y+cV_z$, $V_7=aV_x+(b-1)V_y+cV_z$, and $V_8=aV_x+bV_y+(c-1)V_z$, where a, b, and c are constants.

11 Claims, 20 Drawing Sheets

THREE-INPUT MULTIPLIER AND MULTIPLIER CORE CIRCUIT USED THEREFOR

BACKGROUND OF THE INVENTION

1. Field of the Invention

The present invention relates to a three-input analog multiplier and more particularly, to a three-input multiplier for multiplying three input signals and a multiplier core circuit used therefor, which is suitable for a semiconductor integrated circuit and operable at a supply voltage as low as approximately 1 V.

2. Description of the Prior Art

In general, a conventional three-input multiplier is comprised of a differential circuit and emitter-coupled pairs of bipolar transistors whose collectors are cross-coupled with each other. The emitter-coupled pairs are cascaded at a multistage and the differential circuit is connected in series to the first or last stage of the emitter-coupled pairs.

One of the conventional three-input multipliers is disclosed in detail in IEEE Journal of Solid-State Circuits, VOL. SC-16, NO.4, pp.392–399, August 1981, which is shown in FIG. 1.

As shown in FIG. 1, this conventional three-input multiplier is comprised of a first pair of npn bipolar transistors Q101 and Q102, a second pair of npn bipolar transistors Q103 and Q104, a third pair of npn bipolar transistors Q105 and Q106, a fourth pair of npn bipolar transistors Q107 and Q108, a fifth pair of npn bipolar transistors Q109 and Q110 and a constant current sink 101 sinking a constant current $I_0$.

In a first stage, emitters of the transistors Q101 and Q102 are coupled together and emitters of the transistors Q103 and Q104 are coupled together. Collectors of the transistors Q101 and Q103 are connected to each other and collectors of the transistors Q102 and Q104 are connected to each other. Bases of the transistors Q102 and Q103 are coupled together, and bases of the transistors Q101 and Q104 are coupled together.

A differential output current $I^+$ is derived from the coupled collectors of the transistors Q101 and Q103. Another differential output current $I^-$ is derived from the coupled collectors of the transistors Q102 and Q104. A differential output current ΔI of this three-input multiplier is given by the difference between these two differential output currents $I^+$ and $I^-$, i.e., $\Delta I=I^+-I^-$.

A first input voltage $V_x$ is applied across the coupled bases of the transistors Q102 and Q103 and those of the transistors Q101 and Q104.

In a second stage, similarly, emitters of the transistors Q105 and Q106 are coupled together and emitters of the transistors Q107 and Q108 are coupled together. Collectors of the transistors Q105 and Q107 are connected to each other and collectors of the transistors Q106 and Q108 are connected to each other. The coupled collectors of the transistors Q105 and Q107 are connected to the coupled emitters of the transistors Q101 and Q102. The coupled collectors of the transistors Q106 and Q108 are connected to the coupled emitters of the transistors Q103 and Q104. Bases of the transistors Q105 and Q108 are coupled together and bases of the transistors Q106 and Q107 are coupled together.

A second input voltage $V_y$ is applied across the coupled bases of the transistors Q106 and Q107 and those of the transistors Q105 and Q108.

In a third stage, emitters of the transistors Q109 and Q110 are coupled together to be connected to a terminal of the constant current sink 101. The other end of the constant current sink 101 is connected to the ground. A collector of the transistor Q109 is connected to the coupled emitters of the transistors Q105 and Q106. A collector of the transistor Q110 is connected to the coupled emitters of the transistors Q107 and Q108.

A third input voltage $V_z$ is applied across a base of the transistor Q109 and a base of the transistor Q110.

As clearly seen from FIG. 1, the third, fourth, and fifth emitter-coupled pairs of the transistors Q105, Q106, Q107, Q108, Q109, and Q110 constitute a well-known Gilbert multiplier cell. Therefore, it can be said that the conventional three-input multiplier in FIG. 1 is comprised of the Gilbert multiplier cell and the first and second emitter-coupled pairs of the transistors Q101, Q102, Q103, and Q104 whose collectors are cross-coupled.

In general, supposing that a collector current $I_c$ and a base-to-emitter voltage $V_{BE}$ of a bipolar transistor satisfy the exponential law, the collector current $I_c$ is expressed by the following equation (1).

$$I_C = I_S\left\{\exp\left[\frac{V_{BE}}{V_T}\right] - 1\right\} \tag{1}$$

In the equation (1) $I_S$ is the saturation current, and $V_T$ is the thermal voltage expressed as $V_T$=kT/q, where k is Boltzmann's constant, T is absolute temperature in degrees Kelvin and q is the charge of an electron.

When a bipolar transistor is in a normal operation where the base-to-emitter voltage $V_{BE}$ is approximately 600 mV, the exponential term "$\exp(V_{BE}/V_T)$" has a value of approximately $e^{10}$. Therefore, the constant term "−1" may be ignored. As a result, the equation (1) can be rewritten to the following equation (2).

$$I_C = I_S\exp\left[\frac{V_{BE}}{V_T}\right] \tag{2}$$

Here, if collector currents of the transistors Q101 to Q110 are defined as $I_{C1}$, $I_{C2}$, $I_{C3}$, $I_{C4}$, $I_{C5}$, $I_{C6}$, $I_{C7}$, $I_{C8}$, $I_{C9}$, and $I_{C10}$, respectively, each of these collector currents can be expressed in the same form as shown by the equation (2).

On the other hand, since the differential output current ΔI of the conventional three-input multiplier in FIG. 1 is equal to a differential output current of the first and second emitter-coupled pairs of the transistors Q101 to Q104 whose collectors are cross-coupled, the current ΔI is expressed by the following equation (3) as $$\Delta I = \alpha_F\{(I_{C5}+I_{C7})-(I_{C6}+I_{C8})\}\tanh\left[\frac{V_x}{2V_T}\right] \tag{3}$$

where $\alpha_F$ is the dc common-base current gain factor of an npn bipolar transistor.

The term "$(I_{C5}+I_{C7})$" in the equation (3) is derived from the fact that the current flowing through the coupled emitters of the transistors Q101 and Q102 is expressed as $(I_{C5}+I_{C7})$ Similarly, the term "$(I_{C6}+I_{C8})$" in the equation (3) is derived from the fact that the current flowing through the coupled emitters of the transistors Q103 and Q104 is expressed as $(I_{C6}+I_{C8})$.

The collector currents $I_{C5}$, $I_{C6}$, $I_{C7}$, and $I_{C8}$ have the following relationship as $$(I_{C5}+I_{C7})-(I_{C6}+I_{C8})=\alpha_F(I_{C9}-I_{C10})\tanh\left[\frac{V_y}{2V_T}\right] \tag{4}$$

The collector currents $I_{C9}$ and $I_{C10}$ have the following relationship as $$I_{C9}-I_{C10}=\alpha_F I_0\tanh\left[\frac{V_z}{2V_T}\right] \tag{5}$$

Substitution of the equations (4) and (5) into the equation (3) gives the following equation (6).

$$\Delta I=\alpha_F{}^3 I_0\tanh\left[\frac{V_x}{2V_T}\right]\tanh\left[\frac{V_y}{2V_T}\right]\tanh\left[\frac{V_z}{2V_T}\right] \tag{6}$$

Here, tanh(x) can be approximated in small signal applications as $\tanh(x)=x-(1/3)x^3+\ldots$, $(x<<1)$. Therefore, the above equation (6) can be approximated to the following equation.

$$\Delta I\approx\alpha_F{}^3 I_0\left[\frac{V_x}{2V_T}\right]\left[\frac{V_y}{2V_T}\right]\left[\frac{V_z}{2V_T}\right]=\frac{\alpha_F{}^3 I_0}{8V_T{}^3}V_xV_yV_z \tag{7}$$

$$(|V_x|,\ |V_y|,\ |V_z|\ll 2V_T)$$

It is seen from the equation (7) that the differential output current ΔI of the conventional three-input multiplier in FIG. 1 is proportional to the product ($V_x \bullet V_y \bullet V_z$) of the three input voltages $V_x$, $V_y$, and $V_z$ when the input voltages $V_x$, $V_y$, and $V_z$ are all small. This means that the circuit in FIG. 1 serves as a three-input multiplier for the three input voltages $V_x$, $V_y$, and $V_z$.

In general, a multiplier is an essential functional block in analog signal applications. It is convenient that if three input voltages are available in a multiplier because the number of necessary multipliers can be decreased.

In recent years, there has been the increasing need for analog multipliers operable at a low supply voltage. However, the conventional three-input multiplier as shown in FIG. 1 is unable to operate normally if the power supply voltage is decreased. This is because the conventional three-input multiplier as shown in FIG. 1 includes three stacked stages of the differential transistor pairs.

SUMMARY OF THE INVENTION

An object of the present invention is to provide a three-input multiplier operable at a low supply voltage such as approximately 1 V.

Another object of the present invention is to provide a three-input multiplier having a low power consumption.

Still another object of the present invention is to provide a three-input multiplier core circuit operable at a low supply voltage such as approximately 1 V.

A further object of the present invention is to provide a voltage adder circuit producing eight output voltages to be used as input voltages for an octtail cell from three input voltages.

The above objects together with others not specifically mentioned will become clear to those skilled in the art from the following description.

According to a first aspect of the present invention, a three-input multiplier core circuit for multiplying first, second, and third initial input voltages $V_x$, $V_y$, and $V_z$ is provided, which includes an octtail cell and a common constant current source/sink supplying/sinking a common constant current. The octtail cell has first, second, third, fourth, fifth, sixth, seventh, and eighth bipolar transistors whose emitters are coupled together. The coupled emitters of the first to eighth transistors are connected to the common constant current source/sink. The octtail cell is driven by the common constant current.

Collectors of the first, second, third, and fourth transistors are coupled together to form one of a pair of output terminals. Collectors of the fifth, sixth, seventh, and eighth transistors are coupled together to form the other of the pair of output terminals.

An output of the multiplier core circuit including the multiplication result of the first, second, and third initial input voltages $V_x$, $V_y$, and $V_z$ is differentially derived from the pair of output terminals.

A base of the first transistor is applied with a voltage $V_1$, where $V_1=aV_x+bV_y+cV_z$, and a, b, and c are constants.

A base of the second transistor is applied with a voltage $V_2$, where $V_2=aV_x+(b-1)V_y+(c-1)V_z$.

A base of the third transistor is applied with a voltage $V_3$, where $V_3=(a-1)V_x+bV_y+(c-1)V_z$.

A base of the fourth transistor is applied with a voltage $V_4$, where $V_4=(a-1)V_x+(b-1)V_y+cV_z$.

A base of the fifth transistor is applied with a voltage $V_5$, where $V_5=(a-1)V_x+(b-1)V_y+(c-1)V_z$.

A base of the sixth transistor is applied with a voltage $V_6$, where $V_6=(a-1)V_x+bV_y+cV_z$.

A base of the seventh transistor is applied with a voltage $V_7$, where $V_7=aV_x+(b-1)V_y+cV_z$.

A base of the eighth transistor is applied with a voltage $V_8$, where $V_8=aV_x+bV_y+(c-1)V_z$.

With the three-input multiplier core circuit according to the first aspect of the present invention, the octtail cell formed by the first to eighth bipolar transistors and driven by the common constant current is used to realize a three-input multiplier function. Also, the first to eighth transistors of the octtail cell are not stacked but arranged laterally. In other words, the octtail cell constitutes only a single stage of transistors.

As a result, this multiplier core circuit is operable at a low supply voltage such as approximately 1 V.

In a preferred embodiment of the multiplier core circuit according to the first aspect, the constants a, b, and c are set to satisfy the condition of $a\geqq1$, $b\geqq1$, and $c\geqq1$. In this case, the eight voltages $V_1$ to $V_8$ can be simply realized with the use of resistors. There is an additional advantage of a low power consumption.

In another preferred embodiment of the multiplier core circuit according to the first aspect, the constants a, b, and c are set as a=b=c=1. In this case, the eight voltages $V_1$ to $V_8$ are the simplest and as a result, this circuit is realized extremely easy. There is an additional advantage of a low power consumption.

In still another preferred embodiment of the multiplier core circuit according to the first aspect, the constants a, b, and c are set as a=b=c=½. In this case, the eight voltages $V_1$ to $V_8$ are very simple and as a result, this circuit is realized extremely easy.

In a further preferred embodiment of the multiplier core circuit according to the first aspect, the constants a, b, and c are set as a=½, and b=c=1. In this case, the eight voltages $V_1$ to $V_8$ are very simple and as a result, this circuit is realized extremely easy.

According to a second aspect of the present invention, a voltage adder circuit is provided, which includes a first pair of input terminals, a second pair of input terminals, a third pair of input terminals, and first, second, third, fourth, fifth, sixth, seventh, and eighth output terminals.

A first input voltage $V_x$ is applied across the first pair of input terminals. A second input voltage $V_y$ is applied across the second pair of input terminals. A third input voltage $V_z$ is applied across the third pair of input terminals.

A first output voltage $V_1$ is outputted from the first output terminal. A second output voltage $V_2$ is outputted from the second output terminal. A third output voltage $V_3$ is outputted from the third output terminal. A fourth output voltage $V_4$ is outputted from the fourth output terminal. A fifth output voltage $V_5$ is outputted from the fifth output terminal. A sixth output voltage $V_6$ is outputted from the sixth output terminal. A seventh output voltage $V_7$ is outputted from the seventh output terminal. An eighth output voltage $V_8$ is outputted from the eighth output terminal.

Each of the first pair of input terminals is connected to corresponding three ones of the first to eight output terminals through a set of three resistors with a same resistance (R/l), respectively, where l is a constant and R is a resistance. Each of the second pair of input terminals is connected to corresponding three ones of the first to eight output terminals through a set of three resistors with a same resistance (R/m), respectively, where m is a constant. Each of the third pair of input terminals is connected to corresponding three ones of the first to eight output terminals through a set of three resistors with a same resistance (R/n) respectively, where n is a constant.

The first to eighth output voltages $V_1$ to $V_8$ are expressed as $$V_1=(lV_A+mV_C+nV_E)/(l+m+n),$$

$$V_2=(lV_A+mV_D+nV_F)/(l+m+n),$$

$$V_3=(lV_B+mV_C+nV_F)/(l+m+n),$$

$$V_4=(lV_B+mV_D+nV_E)/(l+m+n),$$

$$V_5=(lV_B+mV_D+nV_F)/(l+m+n),$$

$$V_6=(lV_B+mV_C+nV_E)/(l+m+n),$$

$$V_7=(lV_A+mV_D+nV_E)/(l+m+n), \text{ and}$$

$$V_8=(lV_A+mV_C+nV_F)/(l+m+n),$$

where $V_A-V_B=V_x$, $V_C-V_D=V_y$, $V_E-V_F=V_z$.

With the voltage adder circuit according to the second aspect of the present invention, since the first to eighth output voltages $V_1$ to $V_8$ are expressed as above, the first input voltage $V_x$ is multiplied by [l/(l+m+n)], the second input voltage $V_y$ is multiplied by [m/(l+m+n)], the third input voltage $V_z$ is multiplied by [n/(l+m+n)].

Accordingly, this voltage adder circuit is able to produce eight output voltages to be used as input voltages for an octtail cell from three input voltages.

According to a third aspect of the present invention, a bipolar three-input multiplier is provided, which includes the multiplier core circuit according to the first aspect of the present invention and an input circuit.

The input circuit receives first, second, and third initial input voltages $V_x$, $V_y$, and $V_z$, and outputs first to eighth output voltages $V_1$, $V_2$, $V_3$, $V_4$, $V_5$, $V_6$, $V_7$, and $V_8$.

The first to eighth output voltages $V_1$, $V_2$, $V_3$, $V_4$, $V_5$, $V_6$, $V_7$, and $V_8$ are expressed as $$V_1=aV_x+bV_y+cV_z,$$

$$V_2=aV_x+(b-1)V_y+(c-1)V_z,$$

$$V_3=(a-1)V_x+bV_y+(c-1)V_z,$$

$$V_4=(a-1)V_x+(b-1)V_y+cV_z,$$

$$V_5=(a-1)V_x+(b-1)V_y+(c-1)V_z,$$

$$V_6=(a-1)V_x+bV_y+cV_z,$$

$$V_7=aV_x+(b-1)V_y+cV_z, \text{ and}$$

$$V_8=aV_x+bV_y+(c-1)V_z,$$

where and a, b, and c are constants.

With the three-input multiplier according to the third aspect, the multiplier core circuit according to the first aspect is used, and the input circuit produces the first to eighth voltages $V_1$ to $V_8$ required for this multiplier core circuit. Therefore, this multiplier core circuit is operable at a low supply voltage such as approximately 1 V.

BRIEF DESCRIPTION OF THE DRAWINGS

In order that the invention may be readily carried into effect, it will now be described with reference to the accompanying drawings.

DETAILED DESCRIPTION OF THE PREFERRED EMBODIMENTS

Preferred embodiments of the present invention will be described below with reference to the drawings attached.

First Embodiment

Figure 2:
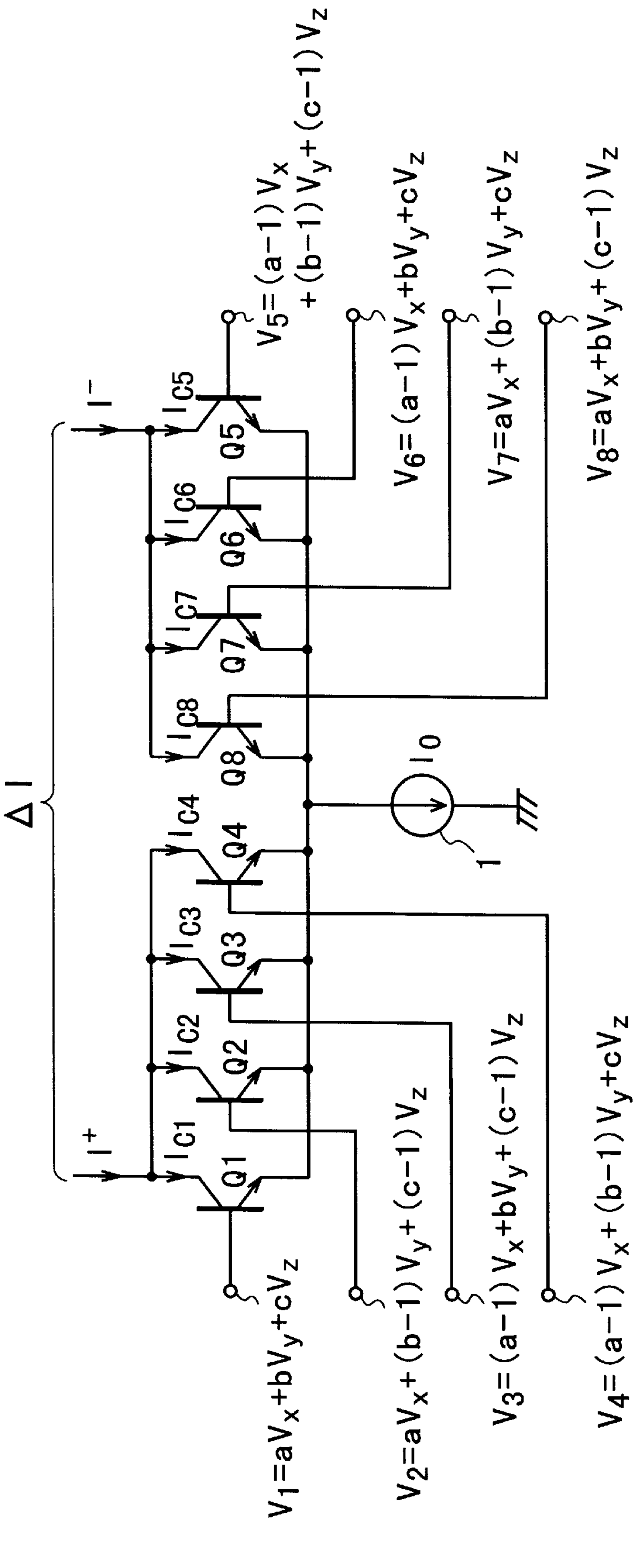
FIG. 2 is a circuit diagram of a bipolar multiplier core circuit according to a first embodiment of the invention.

A bipolar three-input multiplier core circuit according to a first embodiment of the invention is shown in FIG. 2, which multiplies first, second, and third initial input voltages $V_x$, $V_y$, and $V_z$.

As shown in FIG. 2, this multiplier core circuit includes an octtail cell having eight npn bipolar transistors Q1, Q2, Q3, Q4, Q5, Q6, Q7, and Q8 whose emitters are coupled together. The coupled emitters of these eight transistors Q1, Q2, Q3, Q4, Q5, Q6, Q7, and Q8 are connected to one terminal of a common constant current sink 1 sinking a constant current $I_0$. The other terminal of the constant current sink 1 is connected to the ground. These transistors Q1, Q2, Q3, Q4, Q5, Q6, Q7, and Q8 are driven by the constant tail current $I_0$ of the constant current sink 1.

Collectors of the four transistors Q1, Q2, Q3, and Q4 are coupled together to form one of a pair of output terminals. Collectors of the remaining four transistors Q5, Q6, Q7, and Q8 are coupled together to form the other of the pair of output terminals.

A differential output current ΔI of this multiplier core circuit in FIG. 2, which includes the multiplication result of the first, second, and third initial input voltages $V_x$, $V_y$, and $V_z$, is differentially derived from the pair of output terminals.

A base of the transistor Q1 is applied with a first input voltage $V_1$, where $V_1=aV_x+bV_y+cV_z$, and a, b, and c are constants.

A base of the transistor Q2 is applied with a second input voltage $V_2$, where $V_2=aV_x+(b-1)V_y+(c-1)V_z$.

A base of the transistor Q3 is applied with a third input voltage $V_3$, where $V_3=(a-1)V_x+bV_y+(c-1)V_z$.

A base of the transistor Q4 is applied with a fourth input voltage $V_4$, where $V_4=(a-1)V_x+(b-1)V_y+cV_z$.

A base of the transistor Q5 is applied with a fifth input voltage $V_5$, where $V_5=(a-1)V_x+(b-1)V_y+(c-1)V_z$.

A base of the transistor Q6 is applied with a sixth input voltage $V_6$, where $V_6=(a-1)V_x+bV_y+cV_z$.

A base of the transistor Q7 is applied with a seventh input voltage $V_7$, where $V_7=aV_x+(b-1)V_y+cV_z$.

A base of the transistor Q8 is applied with an eighth input voltage $V_8$, where $V_8=aV_x+bV_y+(c-1)V_z$.

Next, the operation principle of the multiplier core circuit according to the first embodiment in FIG. 2 is explained below.

Here, collector currents of the transistors Q1 to Q8 are defined as $I_{C1}$, $I_{C2}$, $I_{C3}$, $I_{C4}$, $I_{C5}$, $I_{C6}$, $I_{C7}$, and $I_{C8}$, respectively. Then, by using the above expression (2), each of these collector currents $I_{C1}$, $I_{C2}$, $I_{C3}$, $I_{C4}$, $I_{C5}$, $I_{C6}$, $I_{C7}$, and $I_{C8}$, are expressed by the following equations (8) to (15), respectively.

$$I_C = I_S \exp\left[\frac{aV_x + bV_y + cV_z + V_R - V_E}{V_T}\right] \tag{8}$$

$$I_{C2} = I_S \exp\left[\frac{aV_x + (b-1)V_y + (c-1)V_z + V_R - V_E}{V_T}\right] \tag{9}$$

$$I_{C3} = I_S \exp\left[\frac{(a-1)V_x + bV_y + (c-1)V_z + V_R - V_E}{V_T}\right] \tag{10}$$

$$I_{C4} = I_S \exp\left[\frac{(a-1)V_x + (b-1)V_y + cV_z + V_R - V_E}{V_T}\right] \tag{11}$$

$$I_{C5} = I_S \exp\left[\frac{(a-1)V_x + (b-1)V_y + (c-1)V_z + V_R - V_E}{V_T}\right] \tag{12}$$

$$I_{C6} = I_S \exp\left[\frac{(a-1)V_x + bV_y + cV_z + V_R - V_E}{V_T}\right] \tag{13}$$

$$I_{C7} = I_S \exp\left[\frac{aV_x + (b-1)V_y + cV_z + V_R - V_E}{V_T}\right] \tag{14}$$

$$I_{C8} = I_S \exp\left[\frac{aV_x + bV_y + (c-1)V_z + V_R - V_E}{V_T}\right] \tag{15}$$

In the equations (8) to (15), $V_E$ is the common emitter voltage at the coupled emitters of the transistors Q1 to Q8, and $V_R$ is a preset reference voltage.

The transistors Q1 to Q8 are driven by the common tail current $I_0$ and therefore, the following equation (16) is established.

$$I_{C1}+I_{C2}+I_{C3}+I_{C4}+I_{C5}+I_{C6}+I_{C7}+I_{C8}=\alpha_F I_0 \tag{16}$$

Substitution of the above equations (8) to (15) into the equation (16) produces the common exponential term $$I_S \bullet \exp[(V_R-V_B)/V_T]$$

in the resultant equation.

This common exponential term can be expressed as the following equation (17).

$$I_S \exp\left[\frac{V_R - V_E}{V_T}\right] = \frac{\alpha_F I_0}{\exp\left\{\frac{(2a-1)V_x + (2b-1)V_y + (2c-1)V_z}{2V_T}\right\}\cosh\left\{\frac{V_z}{2V_T}\right\}\cosh\left\{\frac{V_y}{2V_T}\right\}\cosh\left\{\frac{V_z}{2V_T}\right\}} \tag{17}$$

Accordingly, the differential output current ΔI of the multiplier core circuit in FIG. 2 is expressed as the following equation (18).

$$\begin{aligned} \Delta I &= I^+ - I^- = (I_{c1} + I_{c2} + I_{c3} + I_{c4}) - (I_{c5} + I_{c6} + I_{c7} + I_{c8}) \\ &= \frac{\alpha_F I_0 \left\{\frac{(2a-1)V_x + (2b-1)V_y + (2c-1)V_z}{2V_T}\right\}\sinh\left[\frac{V_z}{2V_T}\right]\sinh\left[\frac{V_y}{2V_T}\right]\sinh\left[\frac{V_z}{2V_T}\right]}{\exp\left\{\frac{(2a-1)V_x + (2b-1)V_y + (2c-1)V_z}{2V_T}\right\}\cosh\left[\frac{V_z}{2V_T}\right]\cosh\left[\frac{V_y}{2V_T}\right]\cosh\left[\frac{V_z}{2V_T}\right]} \\ &= \alpha_F I_0 \tanh\left[\frac{V_x}{2V_T}\right]\tanh\left[\frac{V_y}{2V_T}\right]\tanh\left[\frac{V_z}{2V_T}\right] \end{aligned} \tag{18}$$

As seen from the equation (18), the optional constants a, b, and c are successfully eliminated in the differential output current ΔI. This means that the number of the possible combination of the first, second, and third initial input voltages $V_x$, $V_y$, and $V_z$ for realizing the three-input multiplier function is infinite. In other words, the bipolar octtail cell as shown in FIG. 2 may be termed a "three-input multiplier core circuit".

The difference between the equation (18) and the previously described equation (6) is only the power of $\alpha_F$. However, the dc common-base current gain factor $\alpha_F$ has a value of approximately 0.98 to 0.99 when a bipolar transistor is produced through the popular bipolar technology. Therefore, $\alpha_F$ is usually approximated to "1", i.e., $\alpha_F \approx 1$.

Figure 1:
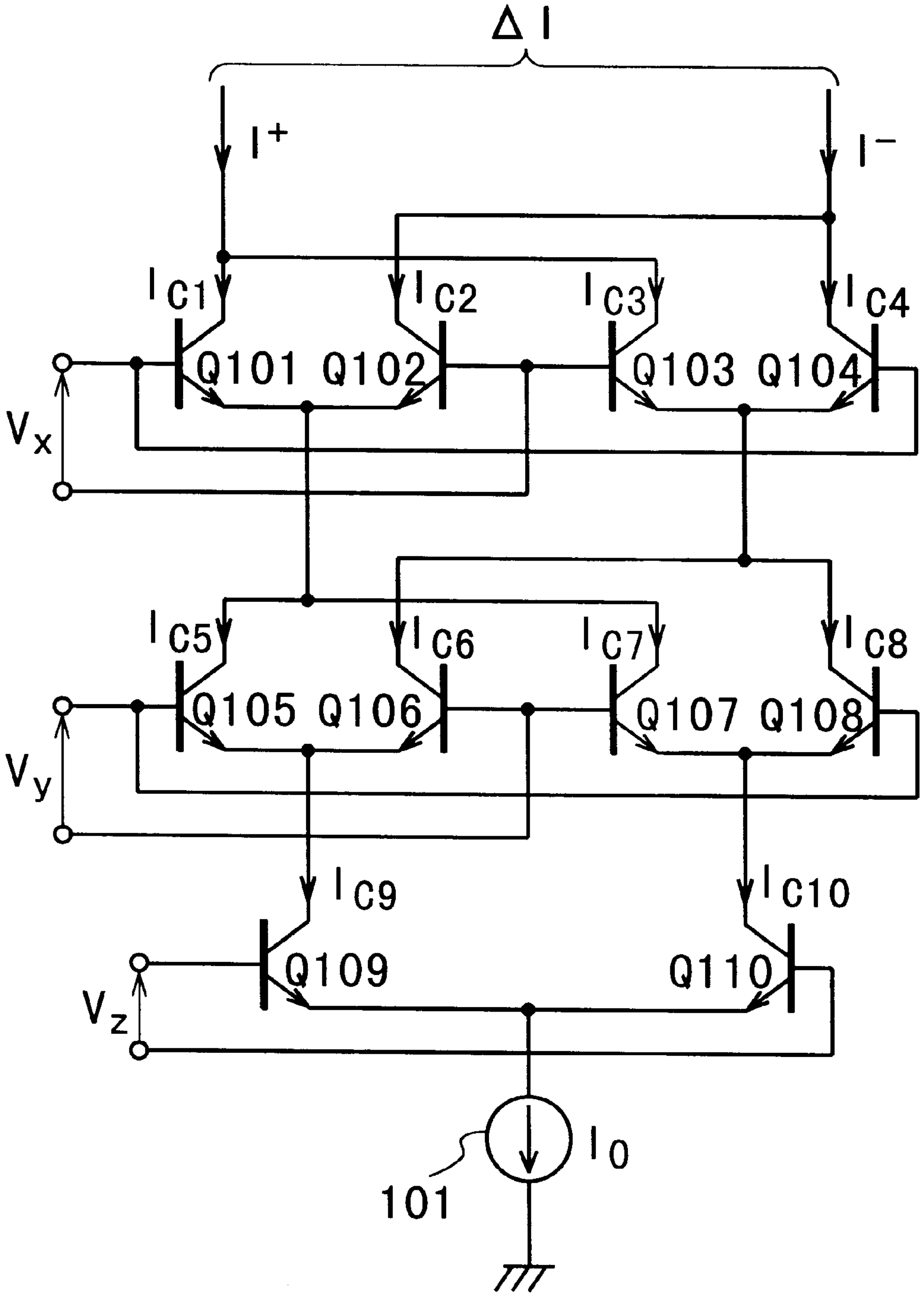
FIG. 1 PRIOR ART
FIG. 1 is a circuit diagram of a conventional bipolar three-input multiplier.

As a result, it can be said that the equation (18) and the previously described equation (6) are the same, and that the multiplier core circuit according to the first embodiment is equivalent in function to the conventional circuit in FIG. 1.

However, unlike the conventional circuit in FIG. 1, with the multiplier core circuit according to the first embodiment in FIG. 2, the eight transistors Q1 to Q8 of the octtail cell are not stacked but arranged laterally. In other words, the octtail cell constitutes only a single stage of transistors. As a result, this multiplier core circuit is operable at a low supply voltage such as approximately 1 V.

Second Embodiment

Figure 3:
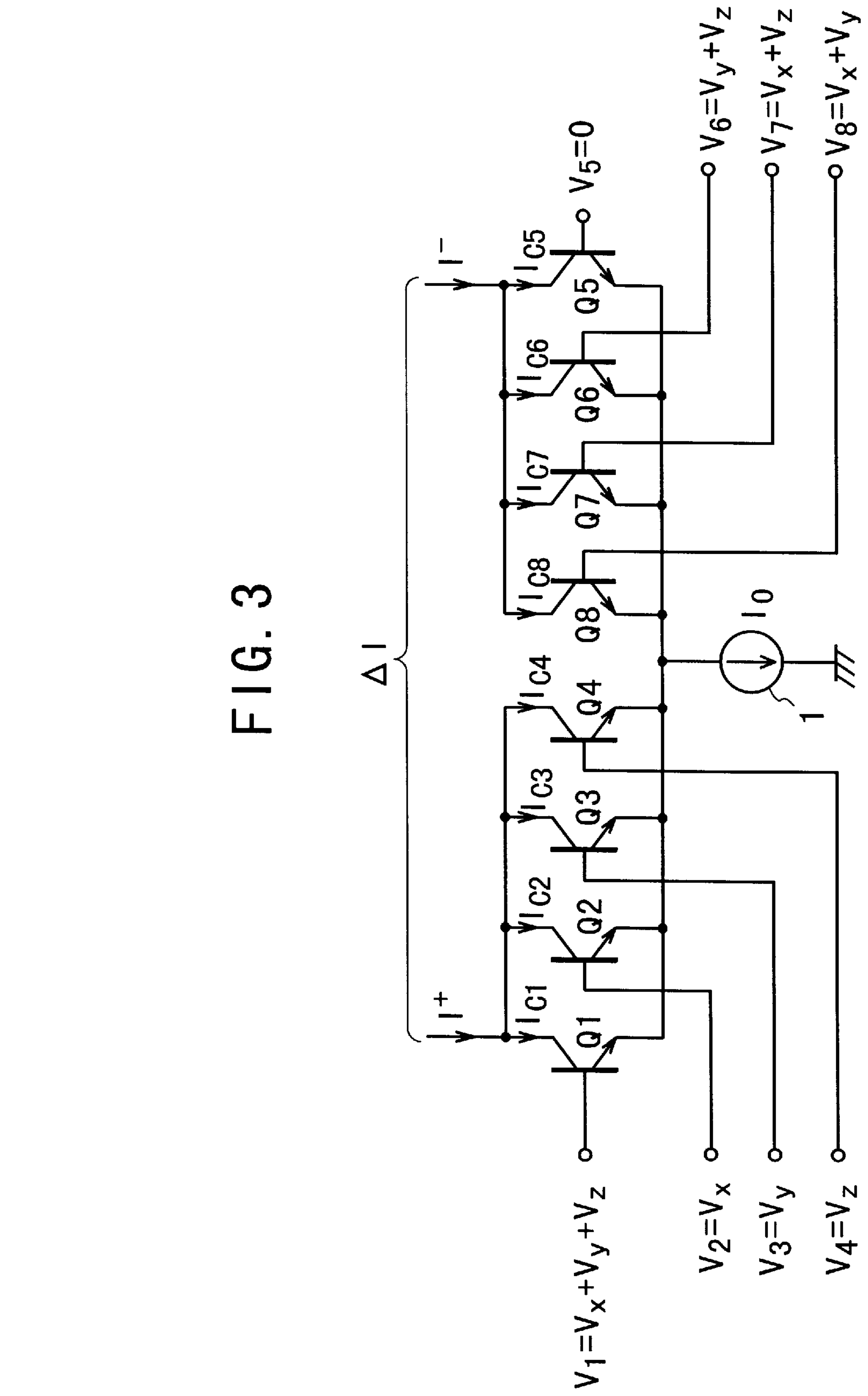
FIG. 3 is a circuit diagram of a bipolar multiplier core circuit according to a second embodiment of the invention.

FIG. 3 shows a three-input multiplier core circuit according to a second embodiment of the invention. This circuit is obtained by setting the constants as a=b=c=1 in the multiplier core circuit according to the first embodiment in FIG. 2.

Specifically, a base of the transistor Q1 is applied with a first input voltage $V_1$, where $V_1=V_x+V_y+V_z$.

A base of the transistor Q2 is applied with a second input voltage $V_2$, where $V_2=V_x$.

A base of the transistor Q3 is applied with a third input voltage $V_3$, where $V_3=V_y$.

A base of the transistor Q4 is applied with a fourth input voltage $V_4$, where $V_4=V_z$.

A base of the transistor Q5 is applied with a fifth input voltage $V_5$, where $V_5=0$.

A base of the transistor Q6 is applied with a sixth input voltage $V_6$, where $V_6=V_y+V_z$.

A base of the transistor Q7 is applied with a seventh input voltage $V_7$, where $V_7=V_x+V_z$.

A base of the transistor Q8 is applied with an eighth input voltage $V_8$, where $V_8=V_x+V_y$.

It is obvious that the multiplier core circuit according to the second embodiment has the same function and the same advantage as those of the first embodiment in FIG. 2.

Figure 6:
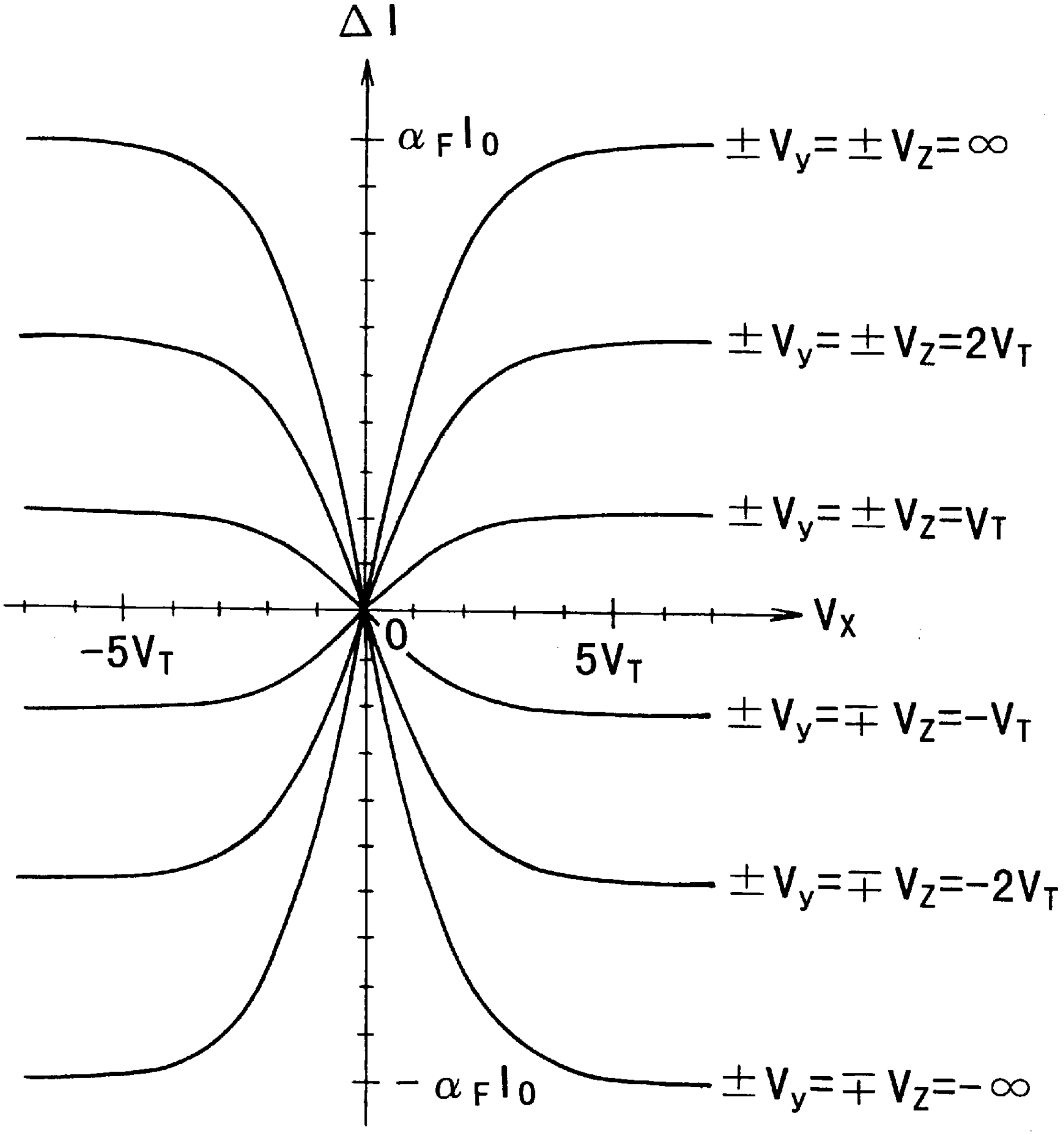
FIG. 6 is a graph showing the theoretical dc transfer characteristic of the bipolar multiplier core circuits according to the first to fourth embodiments of the invention.

FIG. 6 shows the theoretical dc transfer characteristic of the multiplier core circuit according to the second embodiment as a function of $V_x$, in which $V_y$ and $V_z$ are used as parameters. The six curves in FIG. 6 indicate the cases where $\pm V_y=\pm V_z=\pm V_T$, $\pm V_y=\pm V_z=\pm 2V_T$, and $\pm V_y=\pm V_z=\pm\infty$. These curves have linear parts near the origin.

The transconductance characteristic of the multiplier core circuit is expressed by the following equation (19) by differentiating the equation (16) by $V_x$.

$$\frac{d(\Delta I)}{dV_x} = \frac{\alpha_F I_0}{2V_T}\operatorname{sech}\left[\frac{V_x}{2V_T}\right]\tanh\left[\frac{V_y}{2V_T}\right]\tanh^2\left[\frac{V_z}{2V_T}\right] \tag{19}$$

Figure 7:
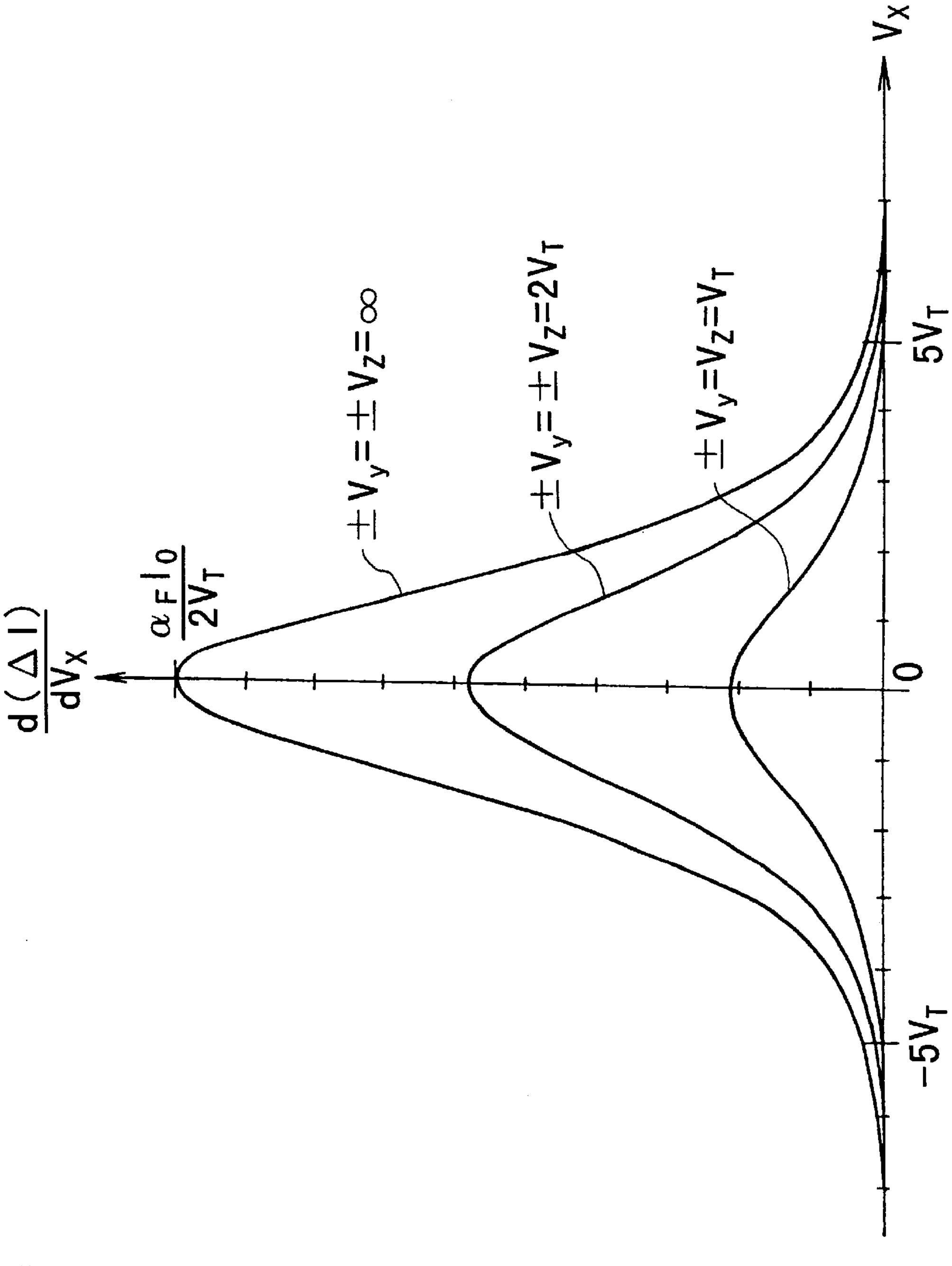
FIG. 7 is a graph showing the theoretical transconductance characteristic of the bipolar multiplier core circuits according to the first to fourth embodiments of the invention.

FIG. 7 shows the theoretical transconductance characteristic of the multiplier core circuit according to the second embodiment as a function of $V_x$, in which $V_y$ and $V_z$ are used as parameters. The three curves in FIG. 7 indicate the cases where $\pm V_y=\pm V_z=V_T$, $\pm V_y=\pm V_z=2V_T$, and $\pm V_y=\pm V_z=\infty$.

Third Embodiment

Figure 4:
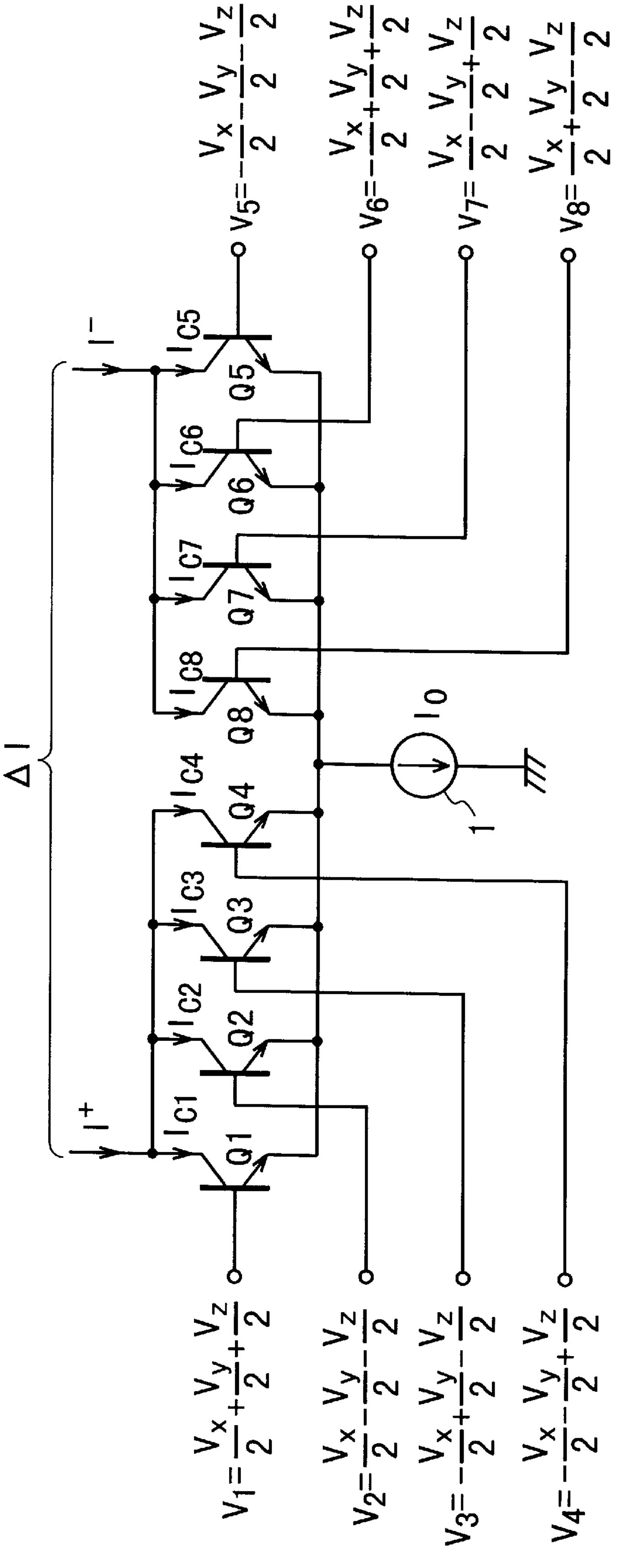
FIG. 4 is a circuit diagram of a bipolar multiplier core circuit according to a third embodiment of the invention.

FIG. 4 shows a three-input multiplier core circuit according to a third embodiment of the invention. This circuit is obtained by setting the constants as a=b=c=½ in the multiplier core circuit according to the first embodiment in FIG. 2.

Specifically, a base of the transistor Q1 is applied with a first input voltage $V_1$, where $V_1=(½)V_x+(½)V_y+(½)V_z$.

A base of the transistor Q2 is applied with a second input voltage $V_2$, where $V_2=(½)V_x-(½)V_y-(½)V_z$.

A base of the transistor Q3 is applied with a third input voltage $V_3$, where $V_3=-(½)V_x+(½)V_y-(½)V_z$.

A base of the transistor Q4 is applied with a fourth input voltage $V_4$, where $V_4=-(½)V_x-(½)V_y+(½)V_z$.

A base of the transistor Q5 is applied with a fifth input voltage $V_5$, where $V_5=-(½)V_x-(½)V_y-(½)V_z$.

A base of the transistor Q6 is applied with a sixth input voltage $V_6$, where $V_6=-(½)V_x+(½)V_y+(½)V_z$.

A base of the transistor Q7 is applied with a seventh input voltage $V_7$, where $V_7=(½)V_x-(½)V_y+(½)V_z$.

A base of the transistor Q8 is applied with an eighth input voltage $V_8$, where $V_8=(½)V_x+(½)V_y-(½)V_z$.

It is obvious that the three-input multiplier core circuit according to the third embodiment has the same function and the same advantage as those of the first embodiment in FIG. 2.

Also, the multiplier core circuit according to the third embodiment has the same dc transfer characteristic and the same transconductance characteristic as shown in FIGS. 6 and 7, respectively.

Fourth Embodiment

Figure 5:
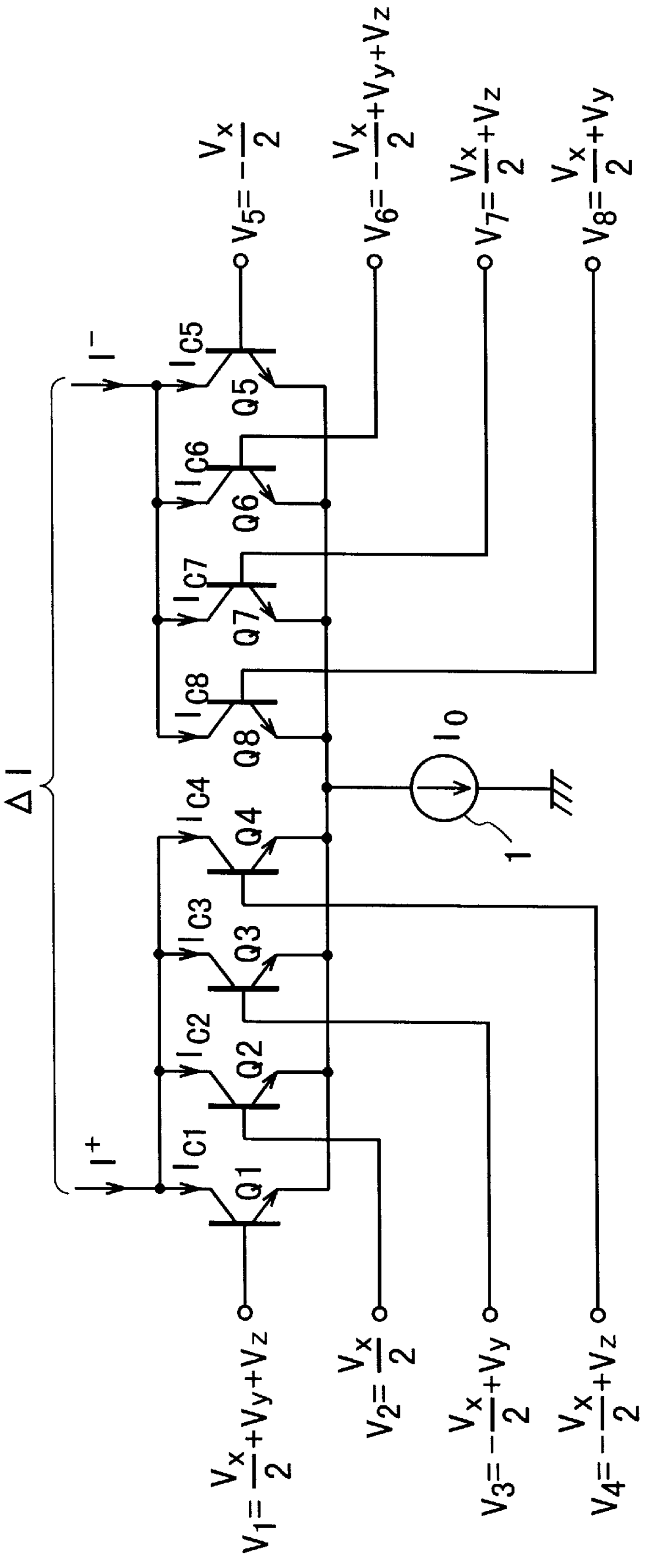
FIG. 5 is a circuit diagram of a bipolar multiplier core circuit according to a fourth embodiment of the invention.

FIG. 5 shows a three-input multiplier core circuit according to a fourth embodiment of the invention. This circuit is obtained by setting the constants as a=½, and b=c=1 in the multiplier core circuit according to the first embodiment in FIG. 2.

Specifically, a base of the transistor Q1 is applied with a first input voltage $V_1$, where $V_1=(½)V_x+V_y+V_z$.

A base of the transistor Q2 is applied with a second input voltage $V_2$, where $V_2=(½)V_x$.

A base of the transistor Q3 is applied with a third input voltage $V_3$, where $V_3=(½)V_x+V_y$.

A base of the transistor Q4 is applied with a fourth input voltage $V_4$, where $V_4=-(½)V_x+V_z$.

A base of the transistor Q5 is applied with a fifth input voltage $V_5$, where $V_5=-(½)V_x$.

A base of the transistor Q6 is applied with a sixth input voltage $V_6$, where $V_6=-(½)V_x+V_y+V_z$.

A base of the transistor Q7 is applied with a seventh input voltage $V_7$, where $V_7=(½)V_x+V_z$.

A base of the transistor Q8 is applied with an eighth input voltage $V_8$, where $V_8=(½)V_x+V_y$.

It is obvious that the three-input multiplier core circuit according to the fourth embodiment has the same function and the same ad vantage as those of the first embodiment in FIG. 2.

Figure 8:
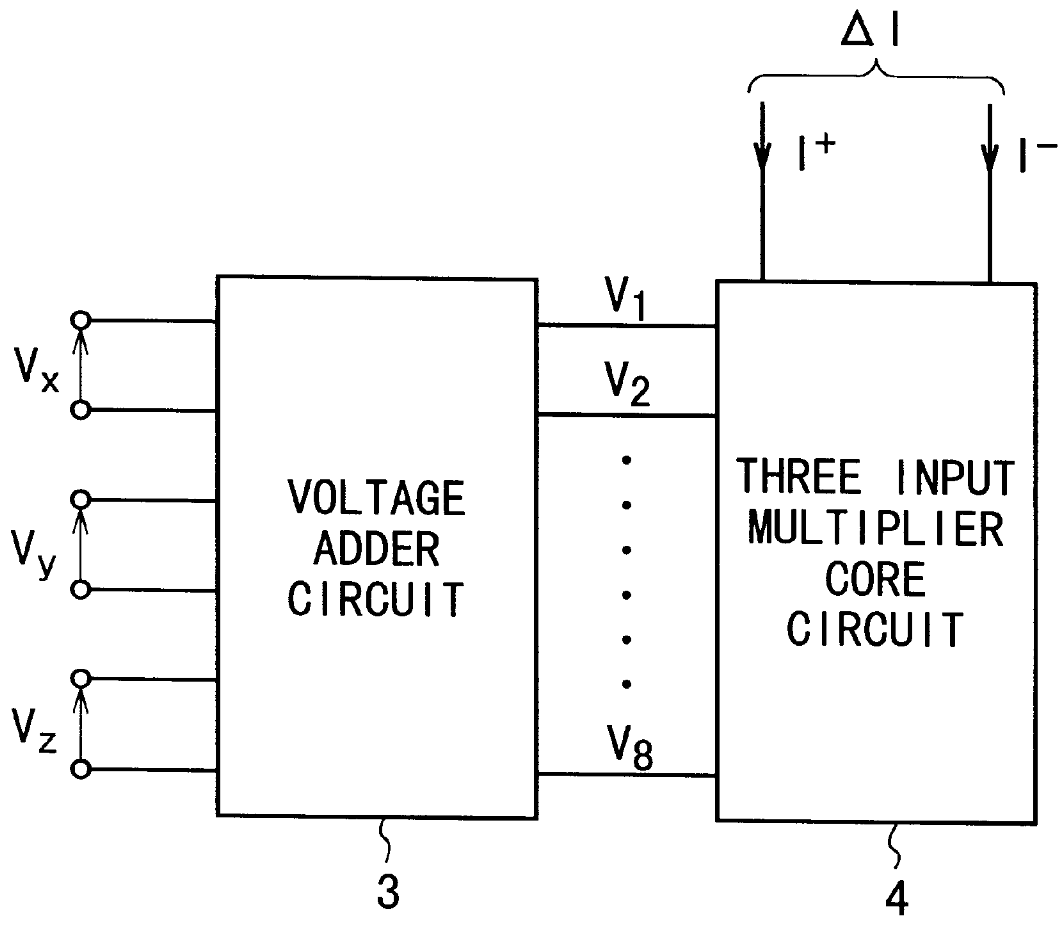
FIG. 8 is a functional block diagram of a bipolar three-input multiplier according to a fifth embodiment of the invention.
Figure 8A:
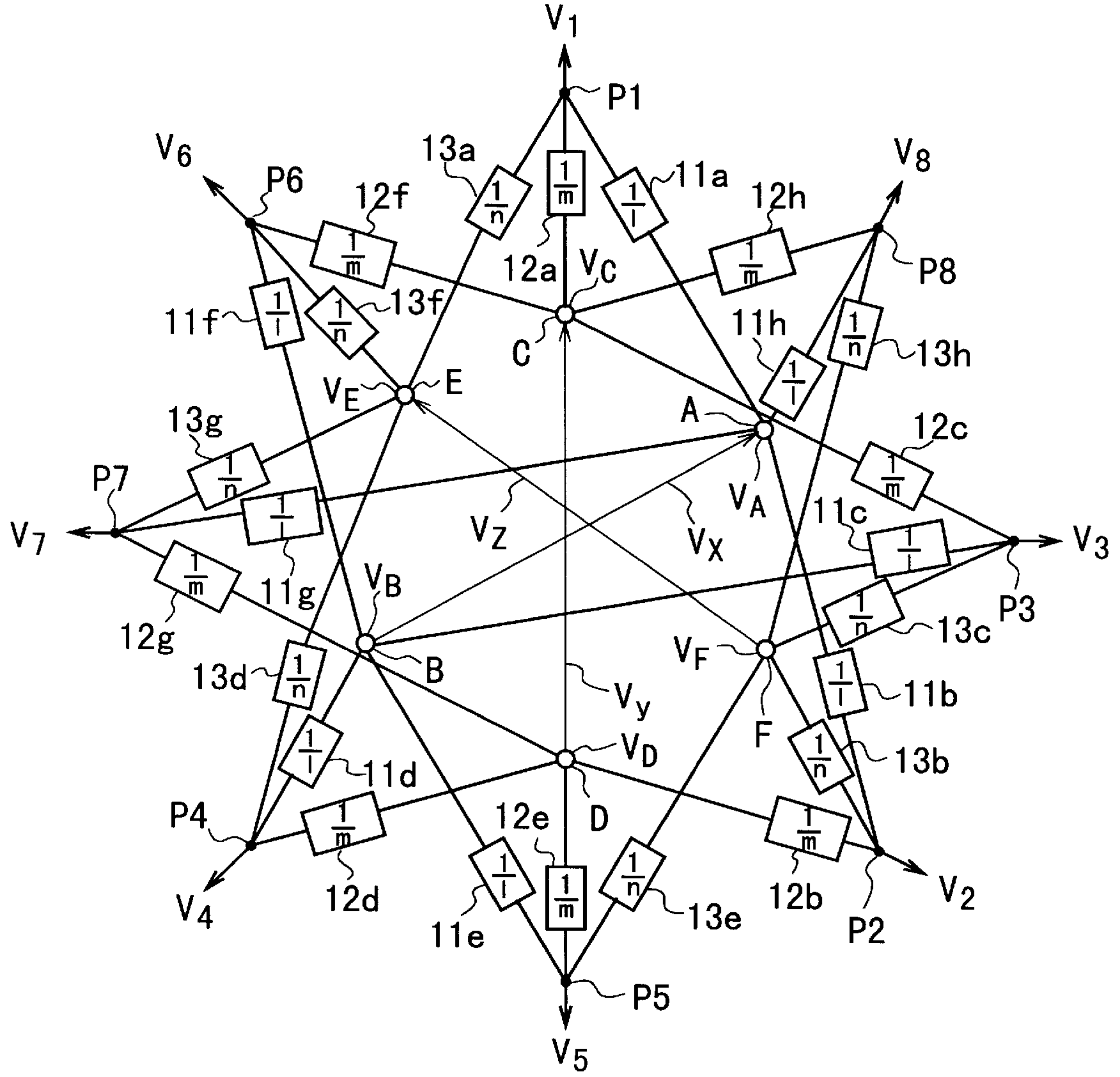
FIG. 8A is a circuit diagram of a resistive voltage adder circuit used for the three-input multiplier according to the fifth embodiment of the invention.
Figure 9:
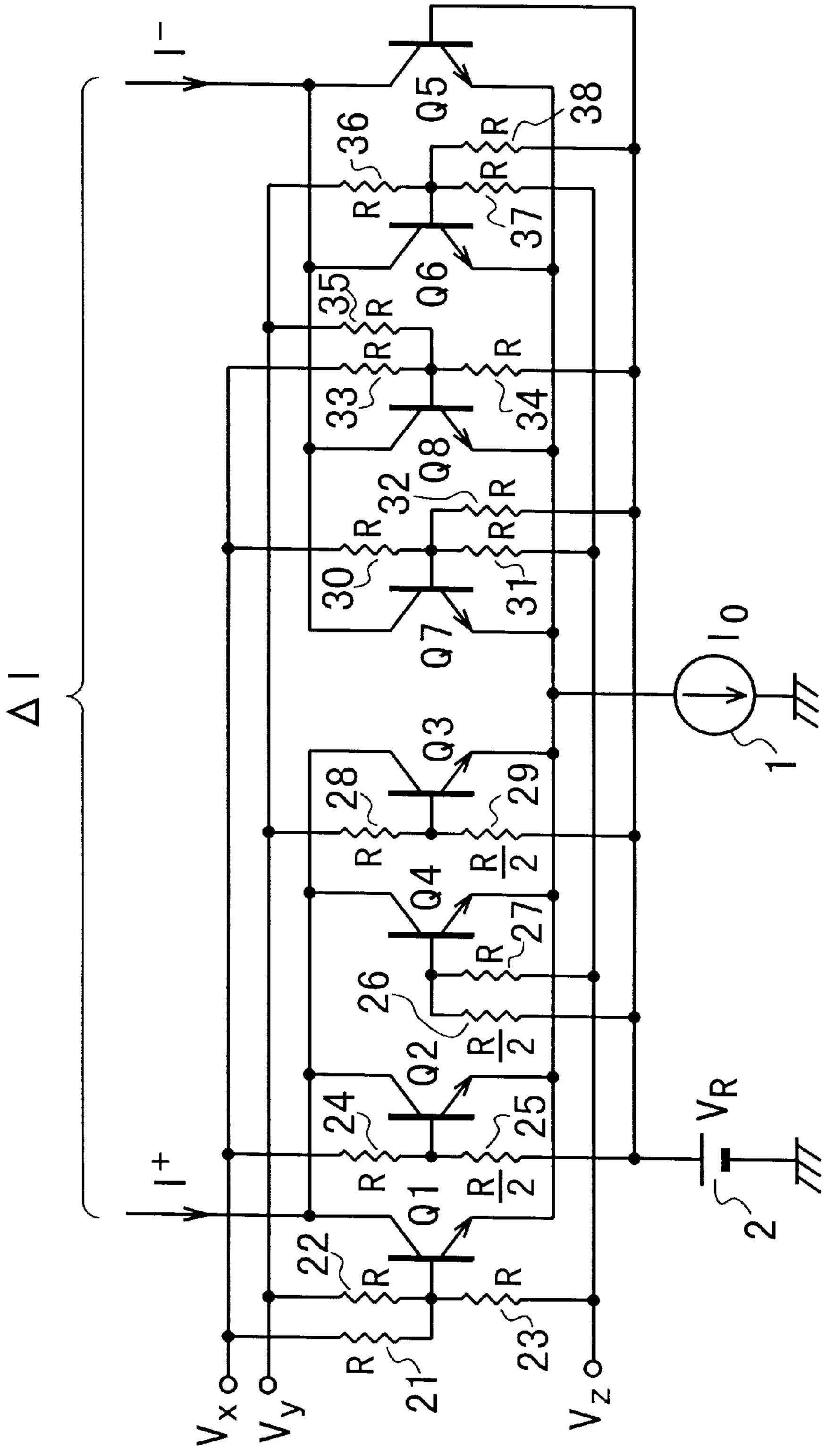
FIG. 9 is a circuit diagram of the bipolar three-input multiplier according to the fifth embodiment of the invention.

Also, the multiplier core circuit according to the fourth embodiment has the same dc transfer characteristic and the same transconductance characteristic as shown in FIGS. 6 and 7, respectively Fifth Embodiment FIGS. 8, 8A, and 9 show a bipolar three-input multiplier according to a fifth embodiment of the invention.

As seen from FIG. 8, this three-input multiplier is comprised of a voltage adder circuit 3 and a three-input multiplier core circuit 4. As the voltage adder circuit 3, a circuit shown in FIG. 8A is used. As the multiplier core circuit 4, any one of the above-described multiplier core circuits according to the first to fourth embodiments is used.

When the constants a, b, and c satisfy the condition of a≧1, b≧1, and c≧1 in the first embodiment, the first to eighth input voltages $V_1$ to $V_8$ can be simply realized with the use of resistors. A resistive voltage adder circuit as shown in FIG. 8A is preferably used as the voltage adder circuit 3.

In FIG. 8A, this voltage adder circuit includes a first pair of input terminals A and B, a second pair of input terminals C and D, a third pair of input terminals E and F, and first, second, third, fourth, fifth, sixth, seventh, and eighth output terminals P1, P2, P3, P4, P5, P6, P7, and P8.

The first initial input voltage $V_x$ is applied across the first pair of input terminals A and B. The polarity of the applied voltage $V_x$ is set in such a way that the potential at the terminal A is higher than that at the terminal B.

The second initial input voltage $V_y$ is applied across the second pair of input terminals C and D. The polarity of the applied voltage $V_y$ is set in such a way that the potential at the terminal C is higher than that at the terminal D.

The initial third input voltage $V_z$ is applied across the third pair of input terminals E and F. The polarity of the applied voltage $V_z$ is set in such a way that the potential at the terminal E is higher than that at the terminal F.

A resistor 11*a* with a resistance "(R/l)" is connected to the input terminal A and the first output terminal P1, where "R" is a resistance and "l" is a positive constant. A resistor 11*b* with a resistance "(R/l)" is connected to the input terminal A and the second output terminal P2. A resistor 11*h* with a resistance "(R/l)" is connected to the input terminal A and the eighth output terminal P8.

A resistor 11*d* with a resistance "(R/l)" is connected to the input terminal B and the fourth output terminal P4. A resistor 11*e* with a resistance "(R/l)" is connected to the input terminal B and the fifth output terminal P5. A resistor 11*f* with a resistance "(R/l)" is connected to the input terminal B and the sixth output terminal P6.

A resistor 12*a* with a resistance "(R/m)" is connected to the input terminal C and the first output terminal P1, where "m" is a positive constant. A resistor 12*f* with a resistance "(R/m)" is connected to the input terminal C and the sixth output terminal P6. A resistor 12*h* with a resistance "(R/m)" is connected to the input terminal C and the eighth output terminal P8.

A resistor 12*b* with a resistance "(R/m)" is connected to the input terminal D and the second output terminal P2. A resistor 12*d* with a resistance "(R/m)" is connected to the input terminal D and the fourth output terminal P4. A resistor 12*e* with a resistance "(R/m)" is connected to the input terminal D and the fifth output terminal P5.

A resistor 13*a* with a resistance "(R/n)" is connected to the input terminal E and the first output terminal P1, where n is a positive constant. A resistor 13*f* with a resistance "(R/n)" is connected to the input terminal E and the sixth output terminal P6. A resistor 13*g* with a resistance "(R/n)" is connected to the input terminal E and the seventh output terminal P7.

A resistor 13*b* with a resistance "(R/n)" is connected to the input terminal F and the second output terminal P2. A resistor 13*c* with a resistance "(R/n)" is connected to the input terminal F and the third output terminal P3. A resistor 13*e* with a resistance "(R/n)" is connected to the input terminal F and the fifth output terminal P5.

A first output voltage $V_1$ is outputted from the first output terminal P1. A second output voltage $V_2$ is outputted from the second output terminal P2. A third output voltage $V_3$ is outputted from the third output terminal P3. A fourth output voltage $V_4$ is outputted from the fourth output terminal P4. A fifth output voltage $V_5$ is outputted from the fifth output terminal P5. A sixth output voltage $V_6$ is outputted from the sixth output terminal P6. A seventh output voltage $V_7$ is outputted from the seventh output terminal P7. An eighth output voltage $V_8$ is outputted from the eighth output terminal P8.

Here, electric potentials at the input terminals A, B, C, D, E, and F are defined as $V_A$, $V_B$, $V_C$, $V_D$, $V_E$, and $V_F$, where $V_A-V_B=V_x$, $V_C-V_D=V_y$, and $V_E-V_F=V_z$, the first to eighth output voltages $V_1$ to $V_8$ are expressed as $$V_1=(lV_A+mV_C+nV_E)/(l+m+n),$$

$$V_2=(lV_A+mV_D+nV_F)/(l+m+n),$$

$V_3=(lV_B+mV_C+nV_F)/(l+m+n)$, $V_4=(lV_B+mV_D+nV_E)/(l+m+n)$, $V_5=(lV_B+mV_D+nV_F)/(l+m+n)$, $V_6=(lV_B+mV_C+nV_E)/(l+m+n)$, $V_7=(lV_A+mV_D+nV_E)/(l+m+n)$, and $V_8=(lV_A+mV_C+nV_F)/(l+m+n)$.

If these eight output voltages $V_1$ to $V_8$ of the voltage adder circuit 3 in FIG. 8 are applied to the multiplier core circuit 4, the differential output current ΔI of the three-input multiplier is expressed as the following equation (20).

$$\Delta I = \alpha_F I_0 \tanh\left\{\frac{lV_x}{2(l+m+n)V_T}\right\} \tanh\left\{\frac{mV_y}{2(l+m+n)V_T}\right\} \tanh\left\{\frac{nV_z}{2(l+m+n)V_T}\right\} \quad (20)$$

It is seen from the equation (20) that compared with the equation (18), the first initial input voltage $V_x$ is multiplied by [l/(l+m+n)], the second initial input voltage $V_y$ is multiplied by [m/(l+m+n)], and the third initial input voltage $V_z$ is multiplied by [n/(l+m+n)]. This leads to the low voltage operation of the three-input multiplier.

When the potentials $V_B$, $V_D$, and $V_F$ at the terminals B, D, and F are set to be equal, (i.e., $V_B=V_D=V_F$), there is an additional advantage that the corresponding resistors 11*e*, 12*e*, and 13*e* which are connected to the fifth output terminal P5 may be eliminated. In this case, it is sufficient that only the reference voltage $V_R$ is simply applied to the fifth output terminal P5, which simplifies the circuit configuration of the voltage adder circuit 3.

The bipolar three-input multiplier according to the fifth embodiment of the invention has a configuration shown in FIG. 9. This three-input multiplier has the voltage adder circuit shown in FIG. 8A where l=m=n.

In FIG. 9, the bipolar transistors Q1, Q2, Q3, Q4, Q5, Q6, Q7, and Q8 and a constant current sink 1 constitute an octtail cell as shown in FIG. 2.

The reference numerals 21, 22, 23, 24, 25, 26, 27, 28, 29, 30, 31, 32, 33, 34, 35, 36, 37, and 38 denote resistors. The resistors 25, 26, 29 have a same resistance (R/2). The remaining resistors have a same resistance R. The reference numeral 2 denotes a voltage source supplying a dc reference voltage $V_R$. These resistors 21 to 38 constitute a resistive voltage adder circuit serving as an input circuit of the octtail cell or multiplier core circuit.

In this embodiment, there is an additional advantage that the circuit configuration of the voltage adder circuit 3 has a simplified configuration.

Further, there is another additional advantage that the three initial input voltages $V_x$, $V_y$, and $V_z$ are decreased to one-third (⅓), because [l/(l+m+n)]=[m/(l+m+n)]=[n/(l+m+n)]=(⅓) is established.

The differential output current ΔI of the three-input multiplier shown in FIG. 9 is expressed as the following equation (21).

$$\Delta I = \alpha_F I_0 \tanh\left[\frac{V_x}{6V_T}\right] \tanh\left[\frac{V_y}{6V_T}\right] \tanh\left[\frac{V_z}{6V_T}\right] \quad (21)$$

Figure 10:
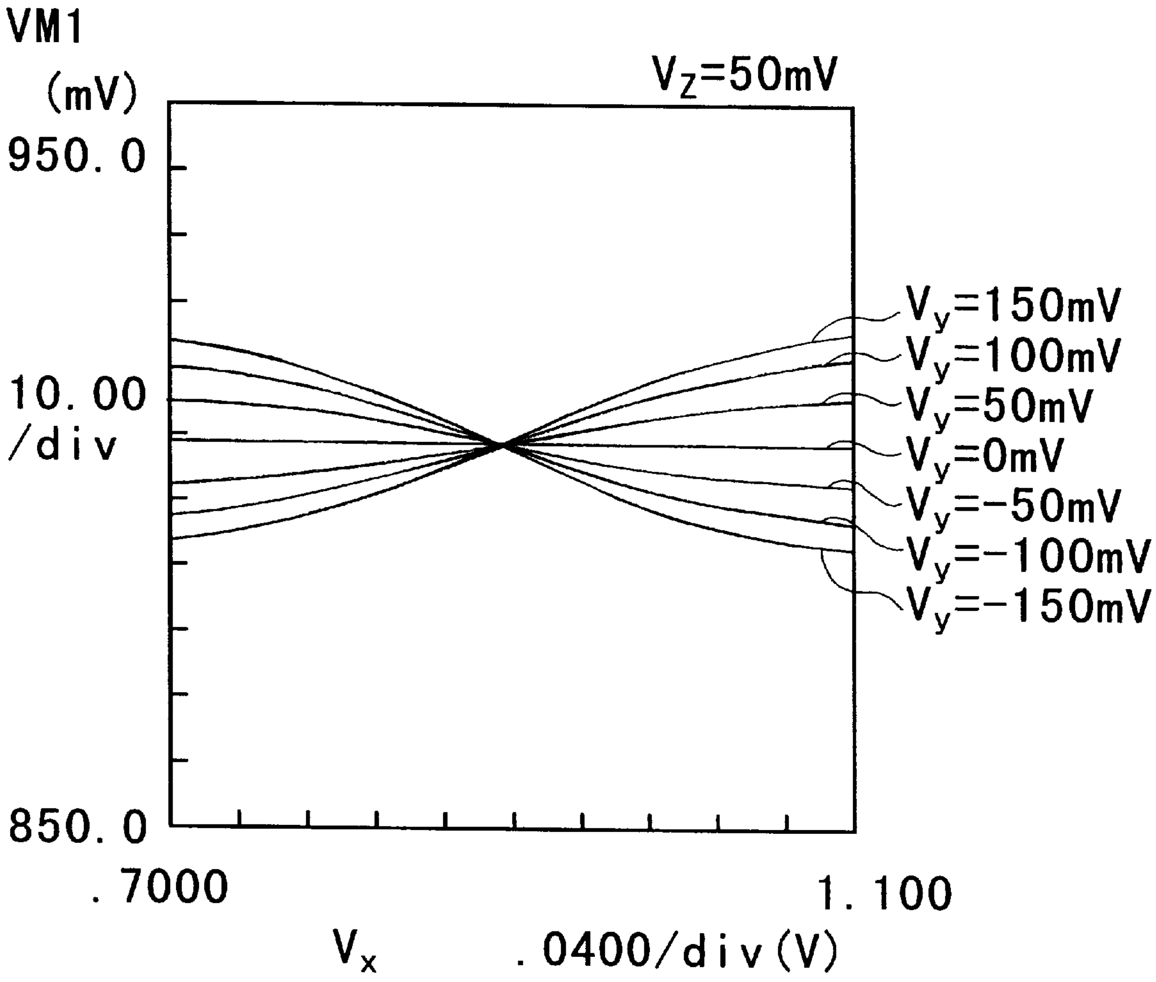
FIG. 10 is a graph showing the measured dc transfer characteristic of the three-input multiplier according to the fifth embodiment of the invention in FIG. 9, where $V_z$=50 mV.

FIG. 10 shows a measured transfer characteristic of the three-input multiplier according to the fifth embodiment in FIG. 9 as a function of $V_x$, while $V_y$ was changed from −150 mV to +150 mV at intervals of 50 mV and $V_z$ was kept as 50 mV. The power supply voltage was 1 V, the tail current $I_0$ was approximately 100 μA, the resistance of the resistors in the voltage adder circuit was all 1 kΩ, and the resistance of a load resistor was 2.2 kΩ.

Figure 11:
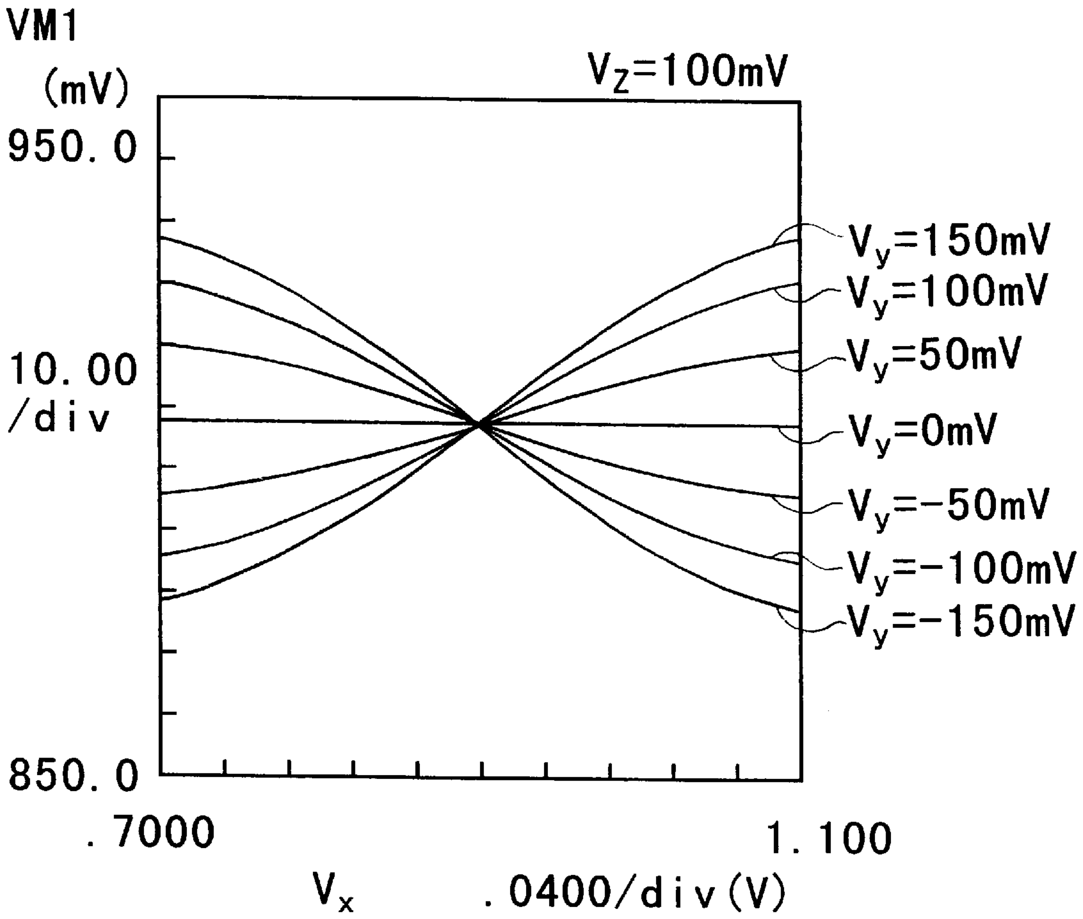
FIG. 11 is a graph showing the dc transfer characteristic of the three-input multiplier according to the fifth embodiment of the invention in FIG. 9, where $V_z$=100 mV.
Figure 12:
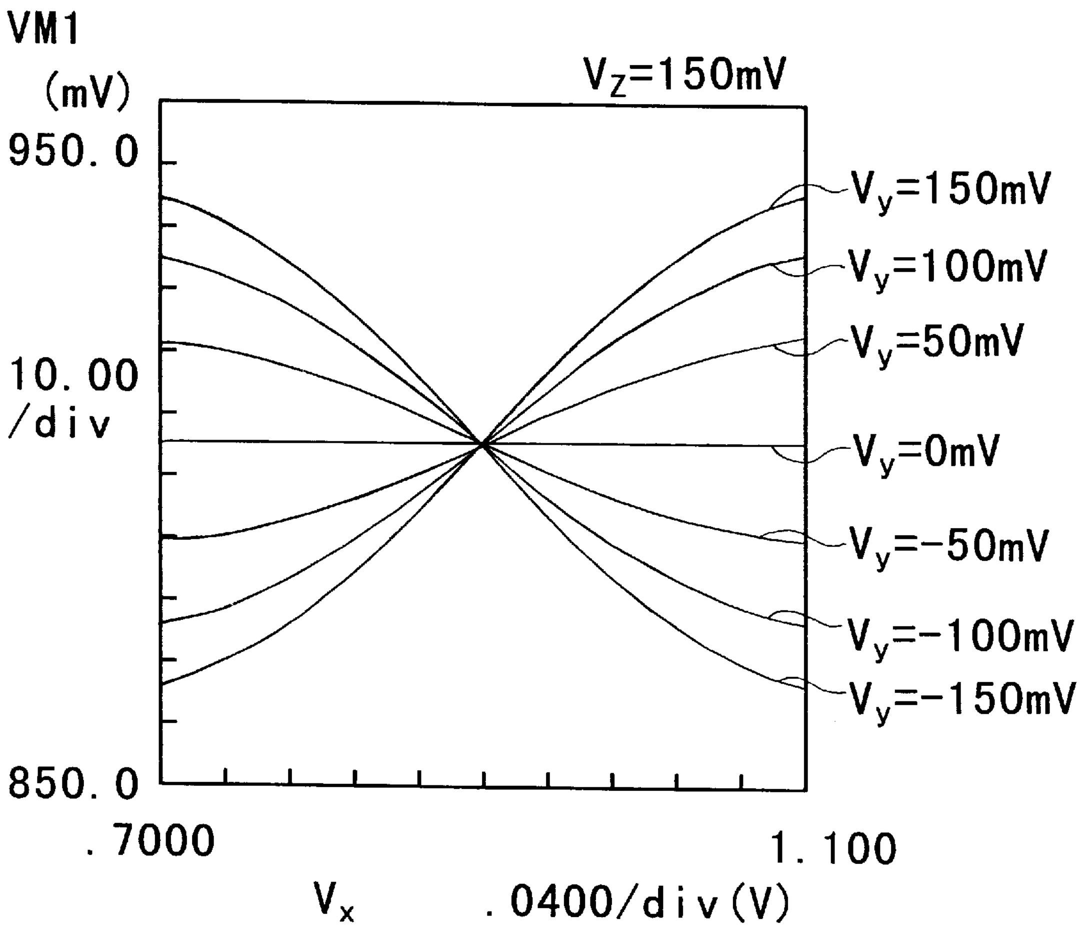
FIG. 12 is a graph showing the measured dc transfer characteristic of the three-input multiplier according to the fifth embodiment of the invention in FIG. 9, where $V_z$=150 mV.
Figure 13:
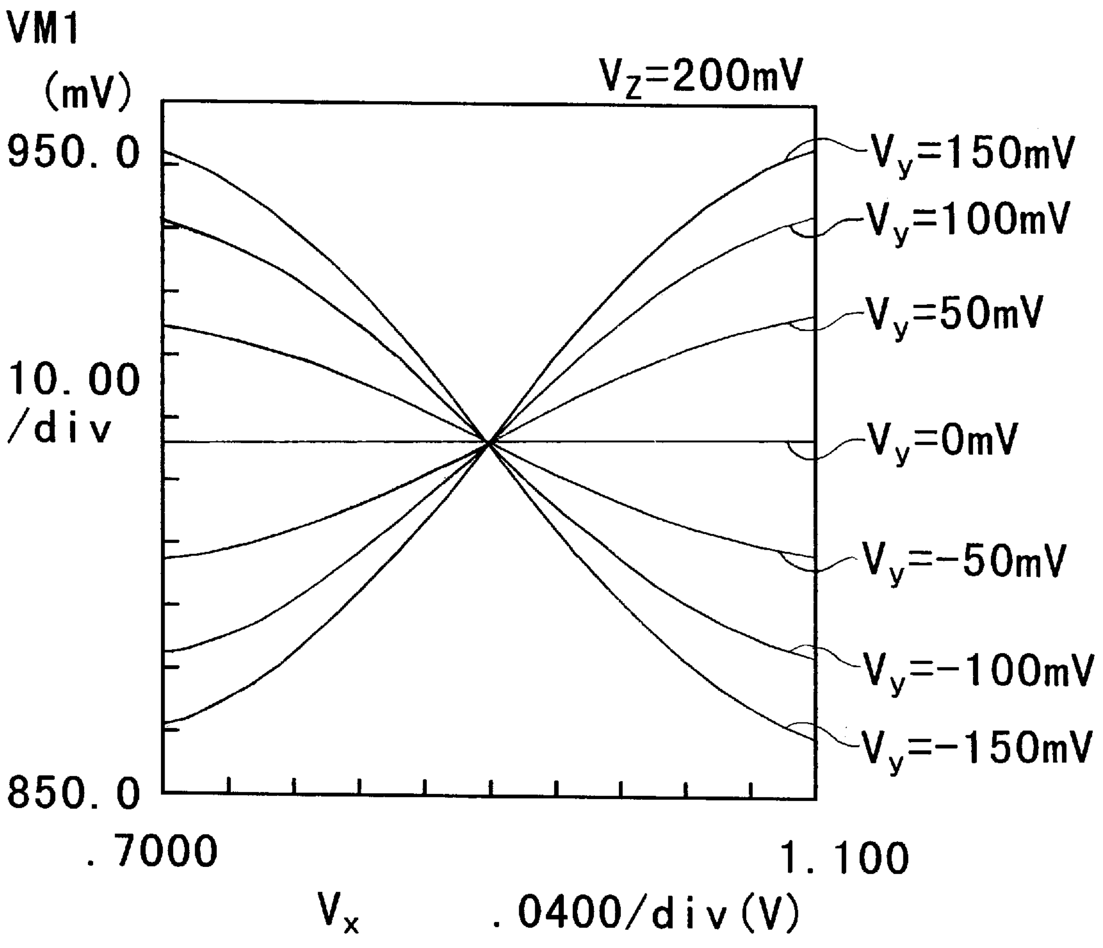
FIG. 13 is a graph showing the measured dc transfer characteristic of the three-input multiplier according to the fifth embodiment of the invention in FIG. 9, where $V_z$=200 mV.

FIGS. 11 to 13 show measured transfer characteristics of the three-input multiplier according to the fifth embodiment in FIG. 9 as a function of $V_x$, while $V_y$ was changed from −150 mV to +150 mV at intervals of 50 mV and $V_z$ was kept at 100 mV, 150 mV, and 200 mV, respectively. The power supply voltage was 1 V, the tail current $I_0$ was approximately 100 μA, the resistance of the resistors in the voltage adder circuit was all 1 kΩ, and the resistance of a load resistor is 2.2 kΩ.

It was seen from FIGS. 10 to 13 that the three-input multiplier according to the fifth embodiment in FIG. 9 has a transfer characteristic similar to the theoretical transfer characteristic as shown in FIG. 6.

Sixth Embodiment

Figure 14:
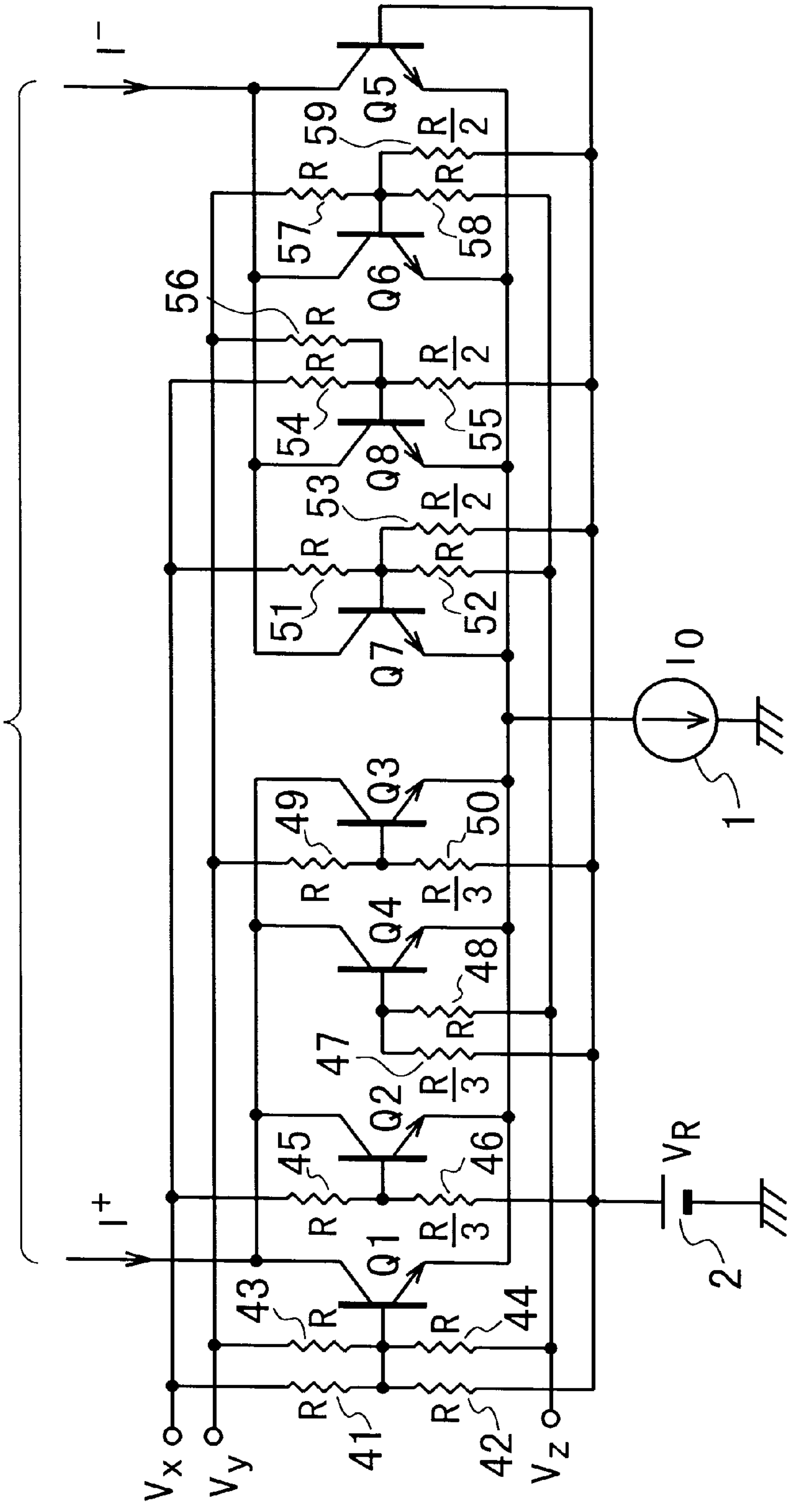
FIG. 14 is a circuit diagram of a bipolar three-input multiplier according to a sixth embodiment of the invention.

FIG. 14 shows a bipolar three-input multiplier according to a sixth embodiment of the invention. This three-input multiplier has the voltage adder circuit shown in FIG. 8A, where l=m=n/2 (e.g., l=m=1, n=2).

In this case, there is an additional advantage that the circuit configuration of the voltage adder circuit 3 has a simplified configuration. Further, there is another additional advantage that the first and second initial input voltages $V_x$ and $V_y$ are decreased to a quarter (¼) and the third initial input voltage $V_z$ is decreased to a half (½), because [l/(l+m+n)]=[m/(l+m+n)]=¼, and [(n/l+m+n)]=½ are established.

In FIG. 14, the bipolar transistors Q1, Q2, Q3, Q4, Q5, Q6, Q7, and Q8 and a constant current sink 1 constitute an octtail call as shown in FIG. 2.

The reference numerals 41, 42, 43, 44, 45, 46, 47, 48, 49, 50, 51, 52, 53, 54, 55, 56, 57, 58, and 59 denote resistors. The resistors 46 47, 50 have a same resistance (R/3). The resistors 53 55, 59 have a same resistance (R/2). The remaining resistors have a same resistance R. The reference numeral 2 denotes a voltage source supplying a dc reference voltage $V_R$. These resistors 41 to 59 constitute a resistive voltage adder circuit serving as an input circuit of the octtail cell or multiplier core circuit.

The differential output current ΔI of this three-input multiplier shown in FIG. 14 is expressed as the following equation (22).

$$\Delta I = \alpha_F I_0 \tanh\left[\frac{V_x}{8V_T}\right] \tanh\left[\frac{V_y}{8V_T}\right] \tanh\left[\frac{V_z}{4V_T}\right] \quad (22)$$

Figure 15:
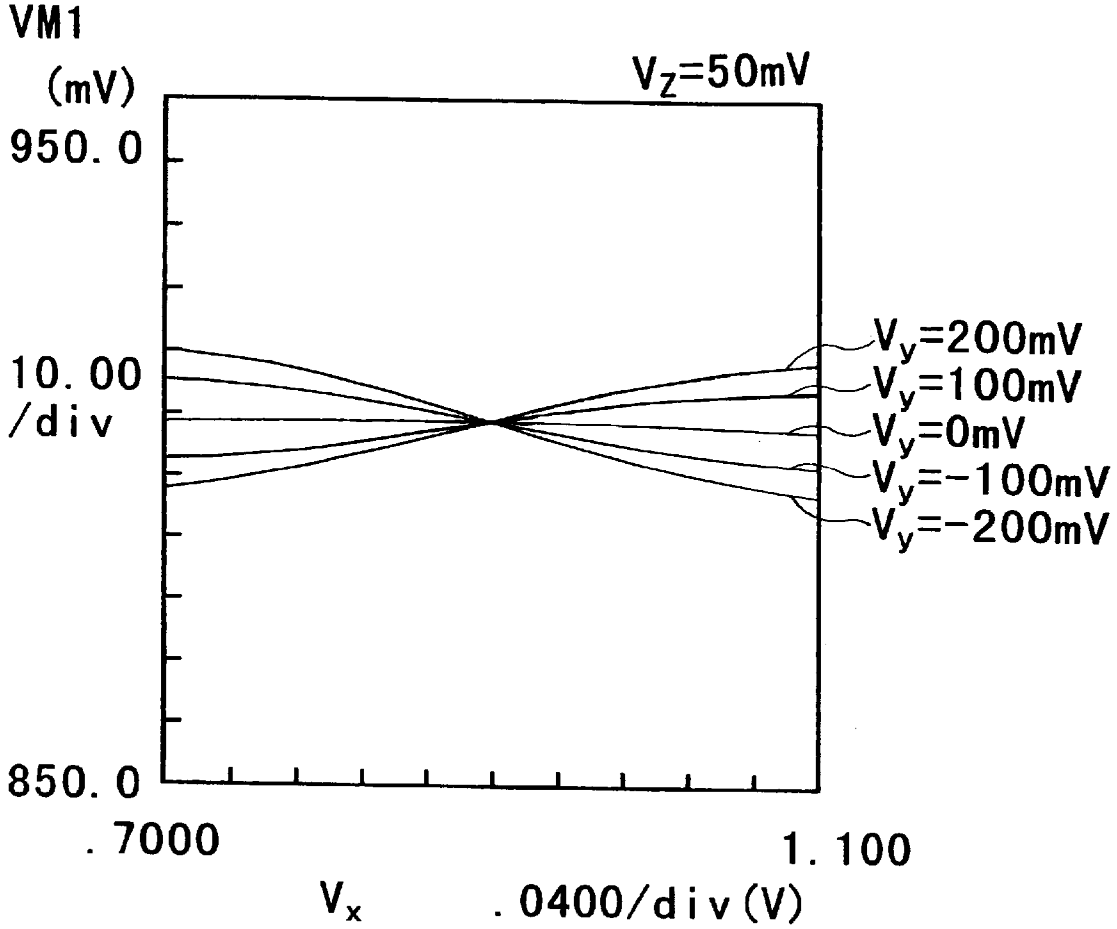
FIG. 15 is a graph showing the measured dc transfer characteristic of the bipolar three-input multiplier according to the sixth embodiment of the invention in FIG. 14, where $V_z$=50 mV.

FIG. 15 shows a measured transfer characteristic of the three-input multiplier according to the sixth embodiment in FIG. 14 as a function of $V_x$, while $V_y$ was changed from −200 mV to +200 mV at intervals of 100 mV and $V_z$ was kept as 50 mV. The power supply voltage was 1 V, the tail current $I_0$ was approximately 100 μA, the resistance of the resistors in the voltage adder circuit was all 1 kΩ, and the resistance of a load resistor was 2.2 kΩ.

Figure 16:
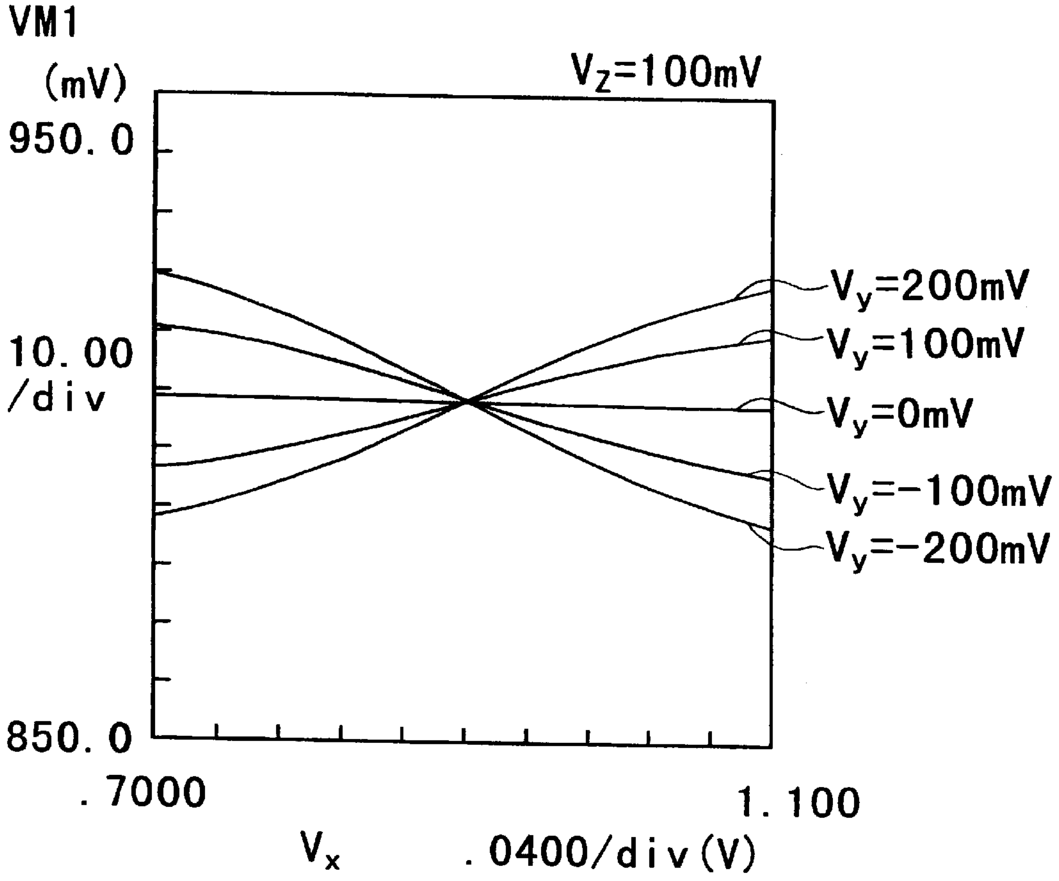
FIG. 16 is a graph showing the measured dc transfer characteristic of the three-input multiplier according to the sixth embodiment of the invention in FIG. 14, where $V_z$=100 mV.
Figure 17:
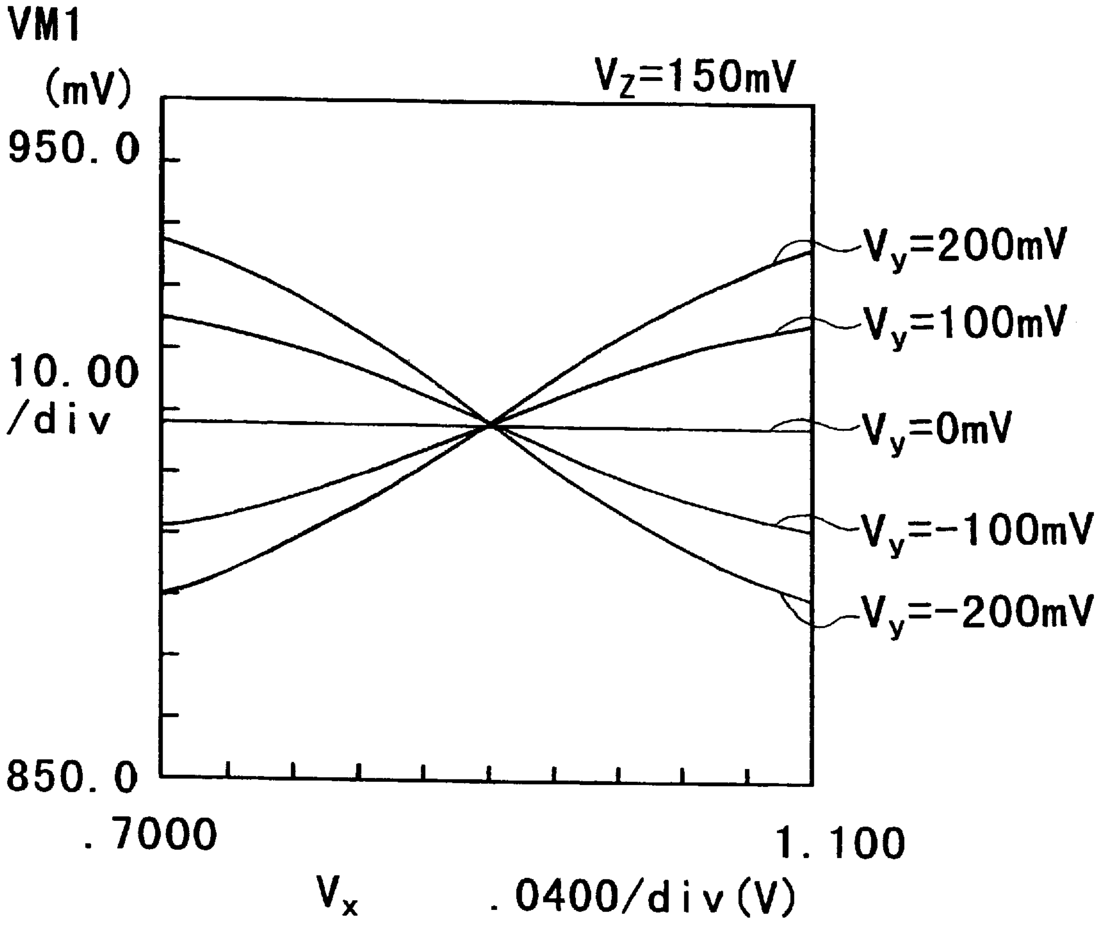
FIG. 17 is a graph showing the measured dc transfer characteristic of the three-input multiplier according to the sixth embodiment of the invention in FIG. 14B where $V_z$=150 mV.
Figure 18:
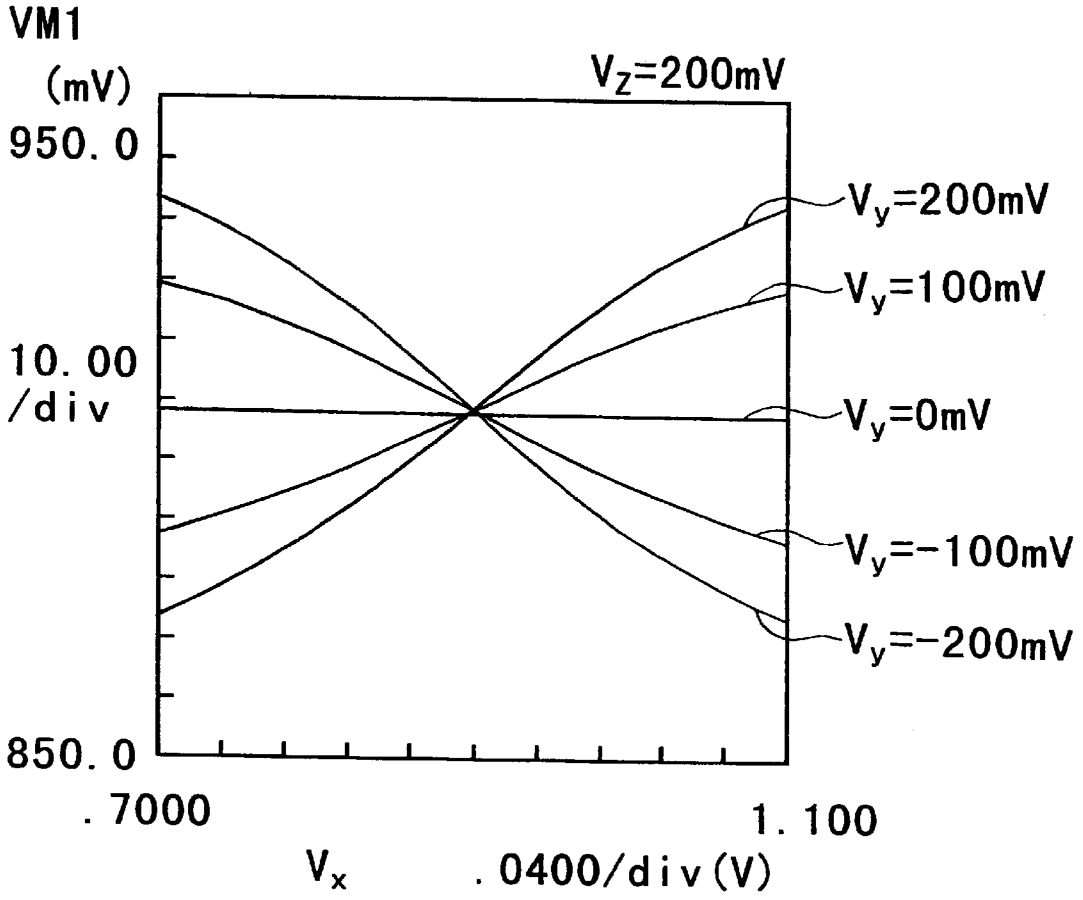
FIG. 18 is a graph showing the measured dc transfer characteristic of the three-input multiplier according to the sixth embodiment of the invention in FIG. 14, where $V_z$=200 mV.

FIGS. 16 to 18 show measured transfer characteristics of the three-input multiplier according to the sixth embodiment in FIG. 14 as a function of $V_x$, while $V_y$ was changed from −200 mV to +200 mV at intervals of 100 mV and $V_z$ as kept at 100 mV, 150 mV, and 200 mV, respectively. The power supply voltage was 1 V, the tail current $I_0$ was approximately 100 μA, the resistance of the resistors in the voltage adder circuit was all 1 kΩ, and the resistance of a load resistor was 2.2 kΩ.

It is seen from FIGS. 15 to 18 that the three-input multiplier according to the sixth embodiment in FIG. 14 has a transfer characteristic similar to the theoretical transfer characteristic as shown in FIG. 6.

Seventh Embodiment

Figure 19:
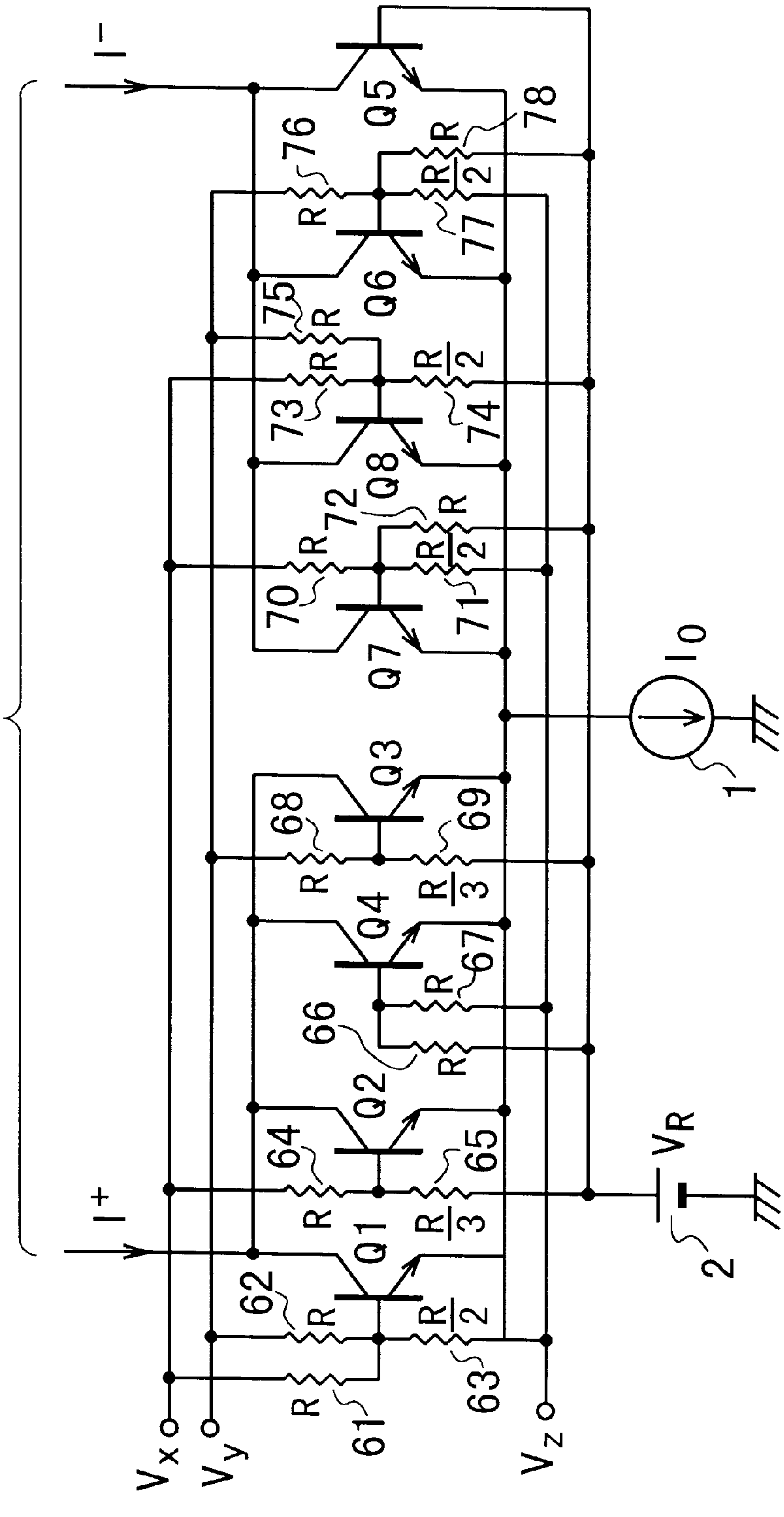
FIG. 19 is a circuit diagram of a bipolar three-input multiplier according to a seventh embodiment of the invention.

FIG. 19 shows a bipolar three-input multiplier according to a seventh embodiment of the invention. The resistive voltage adder circuit shown in FIG. 8A is not used in this embodiment.

In this case, there is an additional advantage that the first to third initial input voltages $V_x$, $V_y$, and $V_z$ are all decreased to a quarter (¼).

In FIG. 19, the bipolar transistors Q1, Q2, Q3, Q4, Q5, Q6, Q7, and Q8 and a constant current sink 1 constitute an octtail cell as shown in FIG. 2.

The reference numerals 61, 62, 63, 64, 65, 66, 67, 68, 69, 70, 71, 72, 73, 74, 75, 76, 77, and 78 denote resistors. The resistors 65 and 69 have a same resistance (R/3). The resistors 63, 71, 74, and 77 have a same resistance (R/2). The remaining resistors have a same resistance R. The reference numeral 2 denotes a voltage source supplying a dc reference voltage $V_R$. These resistors 61 to 78 constitute a resistive voltage adder circuit serving as an input circuit of the octtail cell or multiplier core circuit.

The differential output current ΔI of the three-input multiplier shown in FIG. 19 is expressed as the following equation (23).

$$\Delta I = \alpha_F I_0 \tanh\left[\frac{V_x}{8V_T}\right]\tanh\left[\frac{V_y}{8V_T}\right]\tanh\left[\frac{V_z}{8V_T}\right] \quad (23)$$

Although not shown here, the three-input multiplier according to the seventh embodiment in FIG. 19 has a transfer characteristic similar to the theoretical transfer characteristic as shown in FIG. 6.

While the preferred form of the present invention has been described, it is to be understood that modifications will be apparent to those skilled in the art without departing from the spirit of the invention. The scope of the invention, therefore, is to be determined solely by the following claims.

What is claimed is:

1. A three-input multiplier core circuit for multiplying first, second, and third initial input voltages $V_x$, $V_y$, and $V_z$, said circuit comprising:

an octtail cell having first, second, third, fourth, fifth, sixth, seventh, and eighth bipolar transistors whose emitters are coupled together;

a common constant current source/sink supplying/sinking a common constant current for driving said octtail cell;

said coupled emitters of said first to eighth transistors being connected to said common constant current source/sink;

collectors of said first, second, third, and fourth transistors being coupled together to form one of a pair of output terminals;

collectors of said fifth, sixth, seventh, and eighth transistors being coupled together to form the other of said pair of output terminals;

an output of said multiplier core circuit including the multiplication result of said first, second, and third initial input voltages $V_x$, $V_y$, and $V_z$ being differentially derived from said pair of output terminals;

a base of said first transistor being applied with a voltage $V_1$, where $V_1=aV_x+bV_y+cV_z$ and a, b, and c are constants;

a base of said second transistor being applied with a voltage $V_2$, where $V_2=aV_x+(b-1)V_y+(c-1)V_z$;

a base of said third transistor being applied with a voltage $V_3$, where $V_3=(a-1)V_x+bV_y+(c-1)V_z$;

a base of said fourth transistor being applied with a voltage $V_4$, where $V_4=(a-1)V_x+(b-1)V_y+cV_z$;

a base of said fifth transistor being applied with a voltage $V_5$, where $V_5=(a-1)V_x+(b-1)V_y+(c-1)V_z$;

a base of said sixth transistor being applied with a voltage $V_6$, where $V_6=(a-1)V_x+bV_y+cV_z$;

a base of said seventh transistor being applied with a voltage $V_7$, where $V_7=aV_x+(b-1)V_y+cV_z$; and a base of said eighth transistor being applied with a voltage $V_8$, where $V_8=aV_x+bV_y+(c-1)V_z$.

2. A three-input multiplier core circuit as claimed in claim 1, wherein said constants a, be and c satisfy the condition of $a\geqq1$, $b\geqq1$, and $c\geqq1$.

3. A three-input multiplier core circuit as claimed in claim 1, wherein said constants a, b, and c satisfy the condition of a=b=c=1.

4. A three-input multiplier core circuit as claimed in claim 1, wherein said constants a, b, and c satisfy the condition of a=b=c=½.

5. A three-input multiplier core circuit as claimed in claim 1, wherein said constants a, b, and c satisfy the condition of a=½, and b=c=1.

6. A voltage adder circuit comprising:

a first pair of input terminals;

a second pair of input terminals;

a third pair of input terminals;

first, second, third, fourth, fifth, sixth, seventh, and eighth output terminals;

a first input voltage being applied across said first pair of input terminals;

a second input voltage being applied across said second pair of input terminals;

a third input voltage being applied across said third pair of input terminals, a first output voltage $V_1$ being outputted from said first output terminal;

a second output voltage $V_2$ being outputted from said second output terminal;

a third output voltage $V_3$ being outputted from said third output terminal;

a fourth output voltage $V_4$ being outputted from said fourth output terminal;

a fifth output voltage $V_5$ being outputted from said fifth output terminal;

a sixth output voltage $V_6$ being outputted from said sixth output terminal;

a seventh output voltage $V_7$ being outputted from said seventh output terminal;

an eighth output voltage $V_8$ being outputted from said eighth output terminal;

each of said first pair of input terminals being connected to corresponding three ones of said first to eight output terminals through a set of three resistors with a same resistance (R/l), respectively, where "l" is a constant and "R" is a resistance;

each of said second pair of input terminals being connected to corresponding three ones of said first to eight output terminals through a set of three resistors with a same resistance (R/m), respectively, where "m" is a constant;

each of said third pair of input terminals being connected to corresponding three ones of said first to eight output terminals through a set of three resistors with a same resistance (R/n), respectively, where "n" is a constant; and said first to eighth output voltages $V_1$ to $V_8$ being expressed as $$V_1=(lV_A+mV_C+nV_E)/(l+m+n),$$

$$V_2=(lV_A+mV_D+nV_F)/(l+m+n),$$

$$V_3=(lV_B+mV_C+nV_E)/(l+m+n),$$

$$V_4=(lV_B+mV_C+nV_F)/(l+m+n),$$

$$V_5=(lV_B+mV_D+nV_F)/(l+m+n),$$

$$V_6=(lV_B+mV_C+nV_E)/(l+m+n),$$

$$V_7=(lV_A+mV_D+nV_E)/(l+m+n), \text{ and}$$

$$V_8=(lV_A+mV_C+nV_F)/(l+m+n),$$

where $V_A-V_B=V_x$, $V_C-V_D=V_y$, $V_E-V_F=V_z$, and l, m, and n are constants.

7. A three-input multiplier for multiplying first, second, and third initial input voltages $V_x$, $V_y$, and $V_z$, said three-input multiplier comprising:

an input circuit for outputting first to eighth output voltages from said first, second, and third initial input voltages $V_x$, $V_y$, and $V_z$;

a multiplier core circuit including an octtail cell having first, second, third, fourth, fifth, sixth, seventh, and eighth bipolar transistors whose emitters are coupled together;

a common constant current source/sink supplying/sinking a common constant current for driving said octtail cell;

said coupled emitters of said first to eighth transistors being connected to said common constant current source/sink;

collectors of said first, second, third, and fourth transistors being coupled together to form one of a pair of output terminals;

collectors of said fifth, sixth, seventh, and eighth transistors being coupled together to form the other of said pair of output terminals;

an output of said multiplier core circuit including the multiplication result of said first, second, and third initial input voltages $V_x$, $V_y$, and $V_z$ being differentially derived from said pair of output terminals;

a base of said first transistor being applied with a voltage $V_1$, where $V_1=aV_x+bV_y+cV_z$ and a, b, and c are constant;

a base of said second transistor being applied with a voltage $V_2$, where $V_2=aV_x+(b-1)V_y+(c-1)V_z$;

a base of said third transistor being applied with a voltage $V_3$, where $V_3=(a-1)V_x+bV_y+(c-1)V_z$;

a base of said fourth transistor being applied with a voltage $V_4$, where $V_4=(a-1)V_x+(b-1)V_y+cV_z$;

a base of said fifth transistor being applied with a voltage $V_5$, where $V_5=(a-1)V_x+(b-1)V_y+(c-1)V_z$;

a base of said sixth transistor being applied with a voltage $V_6$, where $V_6=(a-1)V_x+bV_y+cV_z$;

a base of said seventh transistor being applied with a voltage $V_7$, where $V_7=aV_x+(b-1)V_y+cV_z$; and a base of said eighth transistor being applied with a voltage $V_8$, where $V_8=aV_x+bV_y+(c-1)V_z$.

8. A three-input multiplier as claimed in claim 7, wherein said constants a, b, and c satisfy the condition of $a\geqq1$, $b\geqq1$, and $c\geqq1$.

9. A three-input multiplier as claimed in claim 7, wherein said constants a, b, and c satisfy the condition of a=b=c=1.

10. A three-input multiplier as claimed in claim 7, wherein said constants a, b, and c satisfy the condition of a=b=c=½.

11. A three-input multiplier as claimed in claim 7, wherein said constants a, b, and c satisfy the condition of a=½, and b=c=1.

* * * * *

UNITED STATES PATENT AND TRADEMARK OFFICE
CERTIFICATE OF CORRECTION

PATENT NO. : 6,031,409
DATED : February 29, 2000
INVENTOR(S) : Katsuji Kimura

It is certified that error appears in the above-identified patent and that said Letters Patent is hereby corrected as shown below:

<u>Column 9,</u>
Line 4, delete equation 17 entirely and insert --

$$I_S \exp\left[\frac{V_B - V_E}{V_T}\right] = \frac{\alpha_F I_0}{\exp\left\{\frac{(2a-1)V_x + (2b-1)V_y + (2c-1)V_z}{2V_T}\right\}\cosh\left\{\frac{V_x}{2V_T}\right\}\cosh\left\{\frac{V_y}{2V_T}\right\}\cosh\left\{\frac{V_z}{2V_T}\right\}} \tag{17}$$

--;

Line 15, delete equation 18 entirely and insert --

$$= \frac{\alpha_F I_0 \left\{\frac{(2a-1)V_x + (2b-1)V_y + (2c-1)V_z}{2V_T}\right\}\sinh\left[\frac{V_x}{2V_T}\right]\sinh\left[\frac{V_y}{2V_T}\right]\sinh\left[\frac{V_z}{2V_T}\right]}{\exp\left\{\frac{(2a-1)V_x + (2b-1)V_y + (2c-1)V_z}{2V_T}\right\}\cosh\left[\frac{V_x}{2V_T}\right]\cosh\left[\frac{V_y}{2V_T}\right]\cosh\left[\frac{V_z}{2V_T}\right]} \tag{18}$$

$$= \alpha_F I_0 \tanh\left[\frac{V_x}{2V_T}\right]\tanh\left[\frac{V_y}{2V_T}\right]\tanh\left[\frac{V_z}{2V_T}\right]$$

--.

<u>Column 10,</u>
Line 33 delete "16" insert -- 18 --

<u>Column 11,</u>
Line 36 delete "advantage" insert -- advantage --

UNITED STATES PATENT AND TRADEMARK OFFICE
CERTIFICATE OF CORRECTION

PATENT NO. : 6,031,409
DATED : February 29, 2000
INVENTOR(S) : Katsuji Kimura

It is certified that error appears in the above-identified patent and that said Letters Patent is hereby corrected as shown below:

Column 14,
Line 33, delete "call" insert -- cell --

Signed and Sealed this

Thirteenth Day of November, 2001

*Attest:*

Nicholas P. Godici

NICHOLAS P. GODICI

*Attesting Officer*

*Acting Director of the United States Patent and Trademark Office*